United States Patent [19]

Sato et al.

[11] Patent Number: 5,130,729
[45] Date of Patent: Jul. 14, 1992

[54] OPTICAL SYSTEM VIBRO-ISOLATING APPARATUS

[75] Inventors: Yuta Sato, Hachioji; Yoshinori Matsuzawa, Hino, both of Japan

[73] Assignee: Olympus Optical Co., Ltd., Tokyo, Japan

[21] Appl. No.: 592,061

[22] Filed: Oct. 2, 1990

[30] Foreign Application Priority Data

Oct. 4, 1989 [JP] Japan .................. 1-259623
Oct. 4, 1989 [JP] Japan .................. 1-259624
Oct. 4, 1989 [JP] Japan .................. 1-259625

[51] Int. Cl.$^5$ ................ G03B 5/00; G02B 27/64
[52] U.S. Cl. ................ 354/202; 359/554
[58] Field of Search ........... 354/430, 70, 202; 358/222; 350/500; 359/554–557

[56] References Cited

U.S. PATENT DOCUMENTS

| | | | |
|---|---|---|---|
| 3,399,307 | 8/1968 | Levin | 354/430 |
| 3,455,221 | 7/1969 | Reekie | 350/500 |
| 3,690,234 | 9/1972 | Costianes | 354/430 |
| 3,982,255 | 9/1976 | Orlando | 354/70 |
| 4,623,930 | 11/1986 | Oshima et al. | 358/222 |
| 4,788,596 | 11/1988 | Kawakami et al. | 358/222 |
| 4,856,882 | 8/1989 | Oshima et al. | 358/222 X |
| 4,864,339 | 9/1989 | Gross et al. | 354/202 |
| 4,864,409 | 9/1989 | Platte et al. | 358/222 |
| 4,970,540 | 11/1990 | Vasey et al. | 354/202 |
| 4,999,662 | 3/1991 | Bryant | 354/430 X |

FOREIGN PATENT DOCUMENTS 1-131522 5/1989 Japan.

Primary Examiner—W. B. Perkey
Attorney, Agent, or Firm—Frishauf, Holtz, Goodman & Woodward

[57] ABSTRACT

An acceleration of a vibration generated in an optical system of, e.g., a camera is detected by a subtracter from output signals of acceleration sensors. An absolute value circuit calculates an absolute value of an acceleration signal from the subtracter. A voltage-controlled oscillator (VCO) generates clocks having a frequency corresponding to a magnitude of the absolute value from the absolute value circuit. The clocks from the VCO are input to a clock terminal of an up/down counter. An ultrasonic motor (USM) drives the optical system in a direction to cancel the vibration. The USM is driven and controlled by a USM control circuit so as to be rotated at a speed corresponding to a count value of the counter. A motor speed detector detects a USM motor speed from output signals of a rotary encoder. An integrator integrates the acceleration signal from the subtracter to obtain a vibration speed. A comparator compares the USM motor speed with the vibration speed and outputs a comparison result to an up/down terminal of the counter, thereby switching between count-up and count-down operations of the counter.

33 Claims, 24 Drawing Sheets

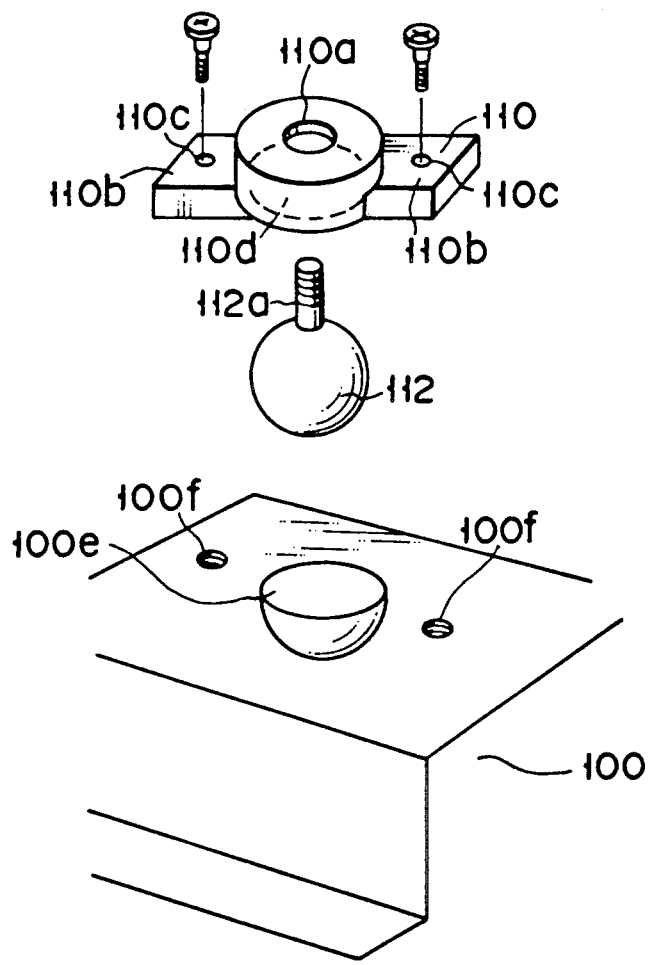
F I G. 3

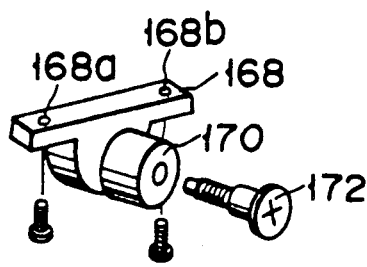
F I G. 4A
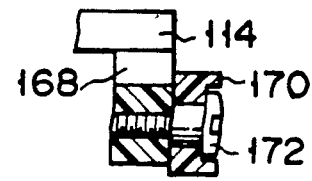
F I G. 4B
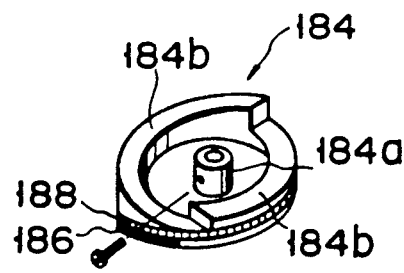
F I G. 5A
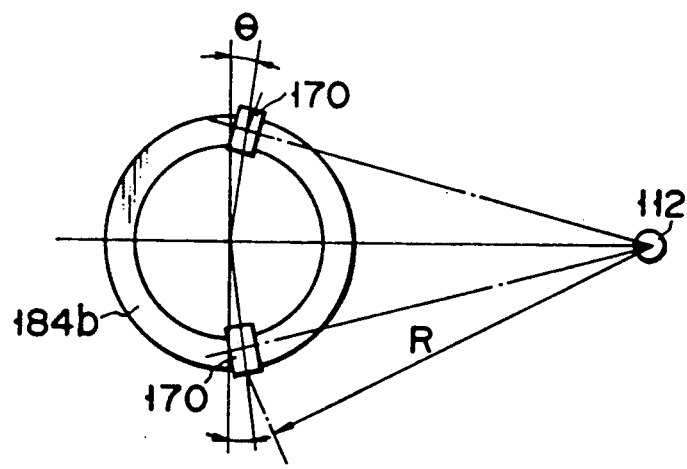
F I G. 5B

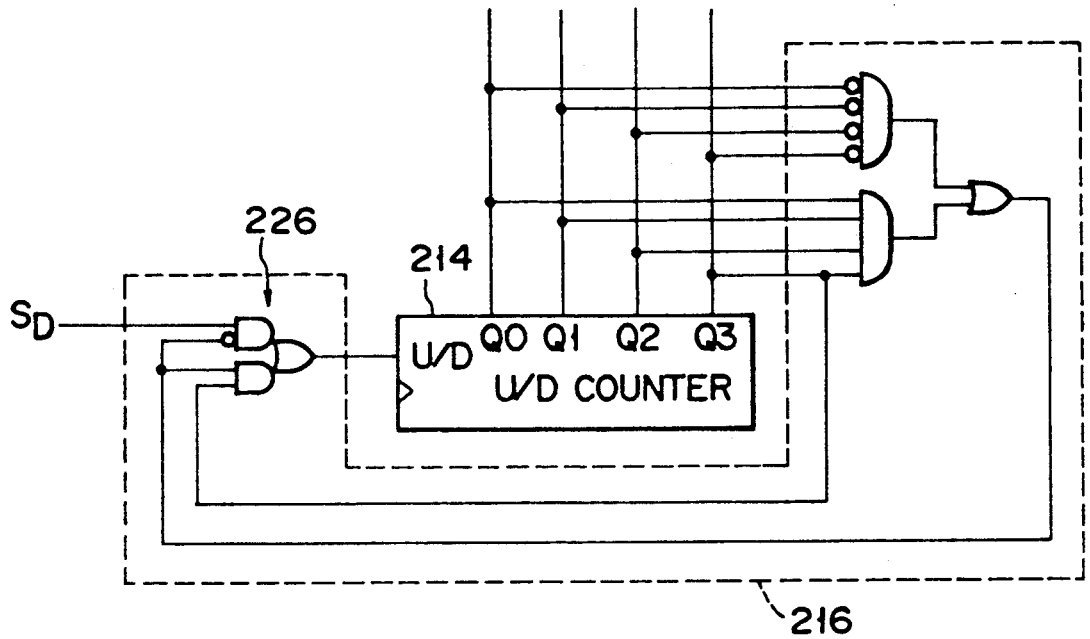
F I G. 11
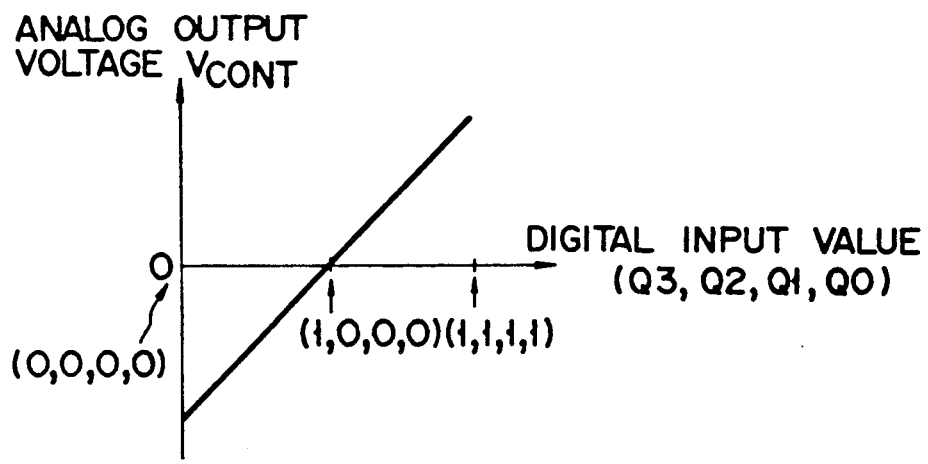
F I G. 12

F I G. 15A
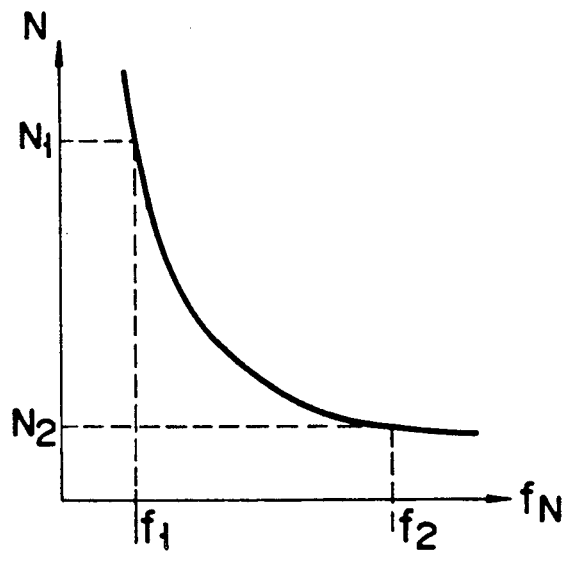
F I G. 15B
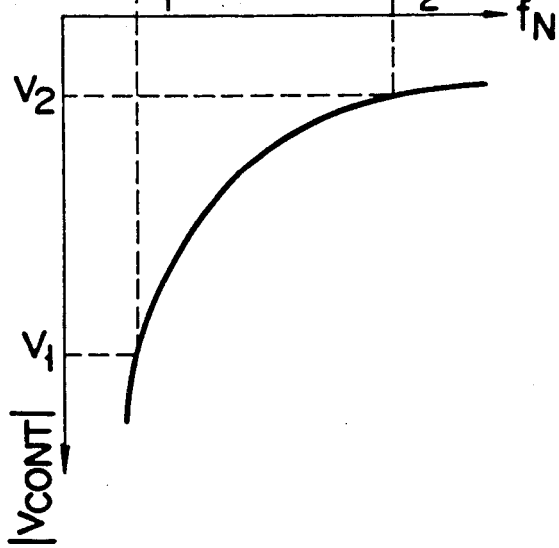

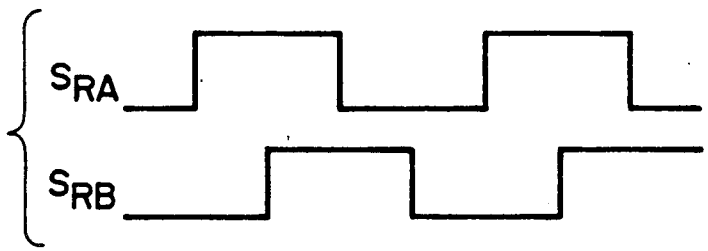
F I G. 19A
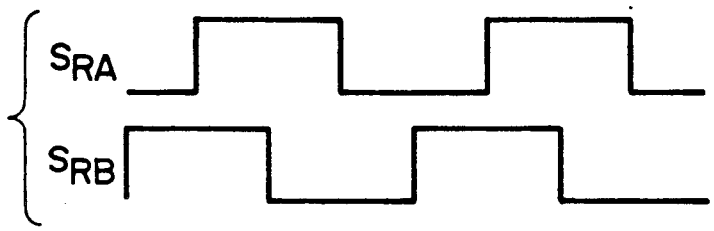
F I G. 19B
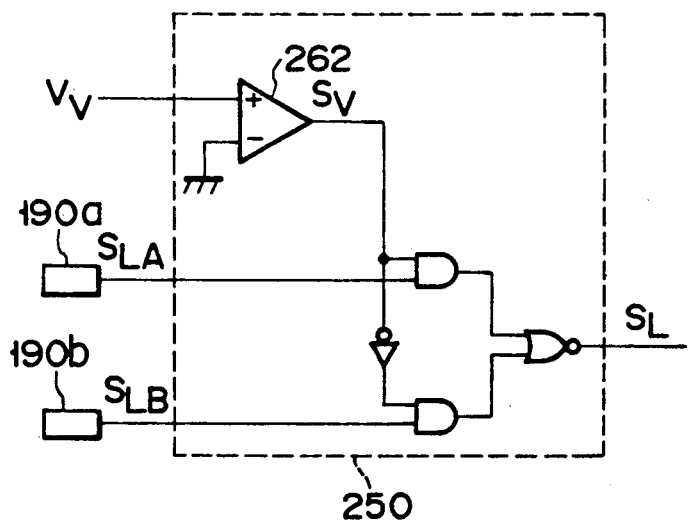
F I G. 20

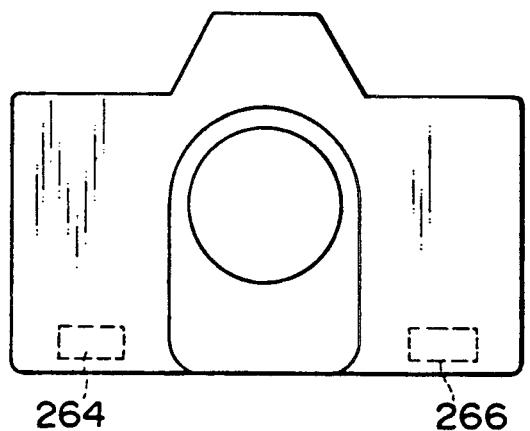
F I G. 23
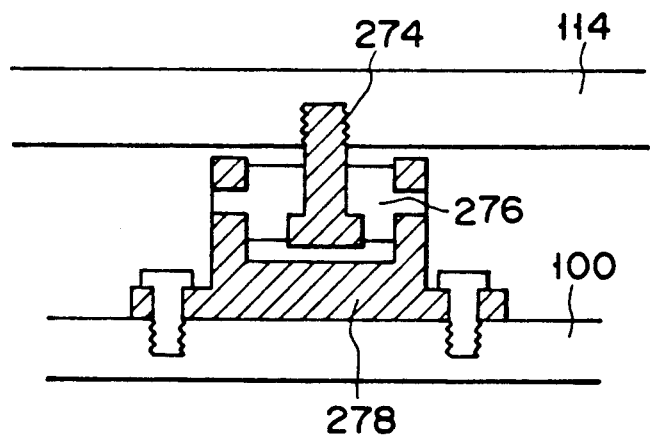
F I G. 24

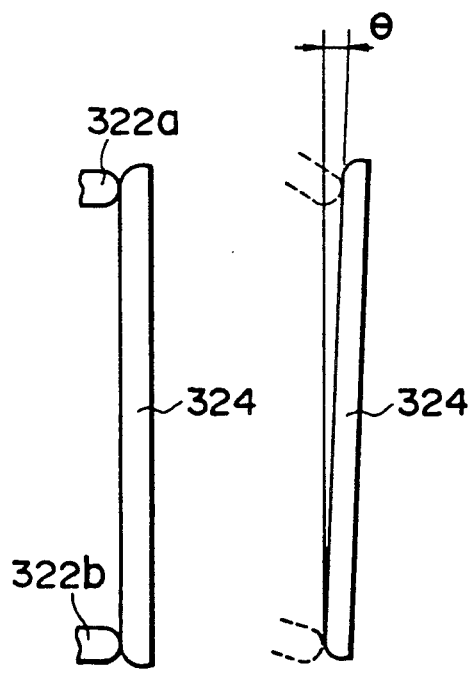
F I G. 29A    F I G. 29B

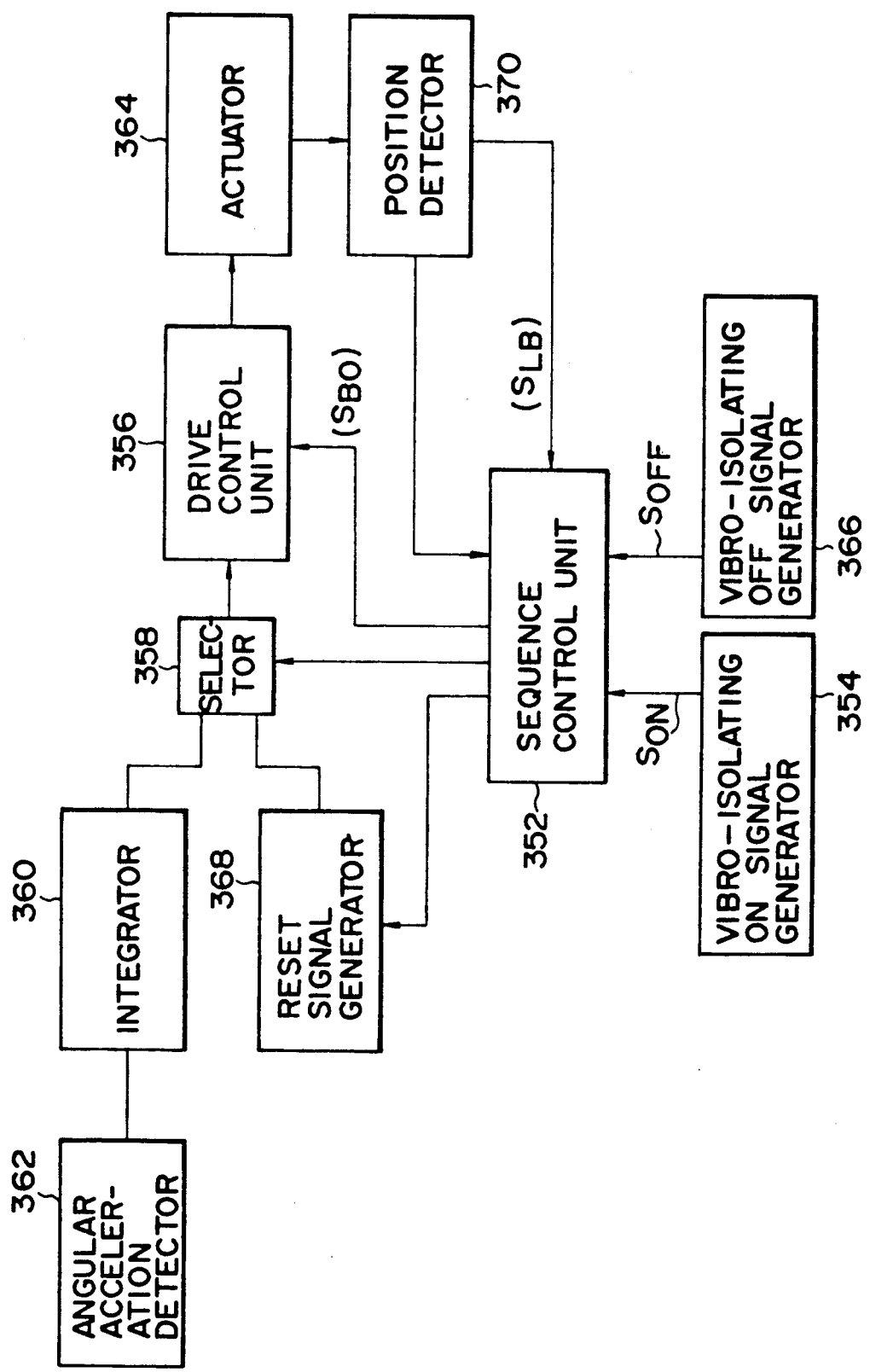
F I G. 35

OPTICAL SYSTEM VIBRO-ISOLATING APPARATUS

BACKGROUND OF THE INVENTION

1. Field of the Invention

The present invention relates to an optical system vibro-isolating apparatus for preventing vibrations of an optical system in, e.g., a camera.

2. Description of the Related Art

Various conventional vibro-isolating apparatuses for optical systems in, e.g., cameras have been proposed. In a typical conventional optical system vibro-isolating apparatus, a vibration of an optical system is detected by a sensor, and an actuator is operated in accordance with an output from this sensor to rotate an optical system such as a photographic lens system, thereby canceling the vibration of the optical system.

In such an optical system vibro-isolating apparatus, accurate tracking servo must be performed to follow the vibration of the optical system. A conventional optical system vibro-isolating apparatus cannot provide an accurate tracking servo operation due to the following reasons.

That is, an operation of the vibro-isolating apparatus is delayed with respect to the vibration of the optical system and is influenced by a pivotal start position of the optical system.

The types of tracking delay of the vibro-isolating operation are a tracking delay at the start of vibro-isolating operation and a tracking delay except for this.

The tracking delay at the start of vibro-isolating operation will be described first. At the start of vibro-isolating operation, the speed of the actuator must be increased from zero speed to a speed corresponding to the vibration speed at the corresponding moment. If the actuator is started at a maximum speed of the vibration, the actuator is changed from a state of zero speed to a state of maximum speed, causing a large ringing behavior. It takes much time to converge this ringing, and a large time delay occurs until an accurate vibro-isolating operation is completed.

The delay occurring except for the start of vibro-isolating operation will be described below. The actuator comprises a reversible motor, and its rotational direction and speed are controlled by a control circuit to coincide with those of the optical system vibration detected by the sensor. In this case, the control circuit includes a clock generator for generating a clock signal having a predetermined frequency. A control state of the motor is changed in response to a clock signal input. The frequency of this clock signal is predetermined in accordance with the magnitude of an acceleration of the vibration of the optical system which is vibro-isolated by the vibro-isolating apparatus. When the clock frequency is constant, no problem occurs under the condition that the acceleration of the vibration of the optical system is constant or small. However, the acceleration is greatly changed in the vibration of a camera. When the clock frequency is determined in correspondence with a small acceleration, a change in speed of the motor cannot follow a change in speed (i.e., acceleration) of the vibration. To the contrary, when the clock frequency is determined in correspondence with a large acceleration, a change in speed of the motor is excessively large upon a decrease in acceleration. In this case, a motor speed signal has an oscillating waveform, and the motor itself generates cluttering noise. In a conventional arrangement, the clock frequency is set to be an intermediate value between maximum and minimum expected accelerations. Therefore, this clock frequency cannot cope with an acceleration close to the maximum acceleration.

Finally, an influence of the pivotal start position of the optical system will be described below. The actuator drives a rotating means for rotating the optical system. A stop position of this rotating means at the end of vibro-isolating operation, i.e., a stop position of the optical system, is not constant. On the other hand, the pivotal range of the optical system is limited. At the end of vibro-isolating operation, the optical system may be stopped at the end of this pivotal range. In this case, the next vibro-isolating operation is started from this end position, and the optical system cannot be moved in the direction of this pivotal end. Therefore, it is impossible to eliminate the vibration in this direction.

SUMMARY OF THE INVENTION

The present invention has been made in consideration of the above situation, and has as its principal object to provide an optical system vibro-isolating apparatus which can improve accuracy of tracking operation for a vibration of an optical system.

More specifically, it is an object of the present invention to provide a method and apparatus for preventing a vibration of an optical system, which can accurately track a vibration having a large acceleration as in a vibration of, e.g., a camera, and properly eliminate the vibration.

It is another object of the present invention to provide an apparatus for preventing a vibration of an optical system, which can accurately prevent the vibration immediately after the start of operation without causing a ringing behavior.

It is still another object of the present invention to provide an optical system vibro-isolating apparatus which can locate an optical system at a free pivot position which allows an accurate vibro-isolating operation immediately after the start of operation.

That is, according to the present invention, there is provided an optical system vibro-isolating apparatus comprising: acceleration sensor means for detecting an acceleration generated by a vibration of an optical system; absolute value means for receiving the acceleration signal from the acceleration sensor means, obtaining an absolute value of the acceleration signal, and outputting an absolute value signal; oscillating means for receiving the absolute value signal output from the absolute value means and outputting an oscillation signal having a frequency corresponding to the absolute value signal so that the frequency is high when the absolute value signal is large, and the frequency is low when the absolute value signal is small; an up/down counter for receiving the oscillation signal output from the oscillating means, counting the oscillation signal, and outputting a resultant count value; a motor for driving the optical system in a direction to cancel the vibration of the optical system; motor control means for receiving the count value output from the up/down counter and controlling the motor at a speed corresponding to the count value; detecting means for detecting a speed of the motor driven by the motor control means and outputting a motor speed signal; integrating means for receiving the acceleration signal output from the acceleration sensor means, integrating the acceleration signal, and outputting a vibration speed signal; and comparing means for receiving the motor speed signal output from the detecting means and the vibration speed signal output from the integrating means, and outputting a switching control signal for switching between an up-count operation and a down-count operation of the up/down counter in accordance with the comparison result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is an exploded perspective view for explaining a support shaft and its bearing surface;

FIG. 4A is an exploded perspective view showing a roller bearing for holding a roller and a roller shaft;

FIG. 4B is a longitudinal sectional view of FIG. 4A;

FIG. 5A is a perspective view showing a structure of a stereoscopic cam fixed to a first ultrasonic motor;

FIG. 5B is a view for explaining an operating state of a roller on the stereoscopic cam shown in FIG. 5A;

FIG. 11 is a diagram showing an overflow preventive circuit;

FIG. 12 is a graph showing input/output characteristics of a digital/analog (D/A) converter;

FIG. 15A is a graph showing characteristics of the USM control circuit;

FIG. 15B is a graph showing characteristics of a logarithmic and a voltage-controlled oscillator (VCO);

FIGS. 19A and 19B are views showing output pulses from the rotary encoders, respectively;

FIG. 20 is a diagram showing an arrangement of a limit detector;

FIG. 23 is a view showing a layout of acceleration sensors for detecting an acceleration in the right-and-left direction;

FIG. 24 is a longitudinal sectional side view showing another arrangement of a support shaft of a vibro-isolating mechanism;

FIG. 29A and 29B are views showing contact portions between rail-like projections and press plates, respectively;

FIG. 35 is a block diagram showing a circuit arrangement to realize another initialization operation;

DETAILED DESCRIPTION OF THE PREFERRED EMBODIMENTS

Figure 1:
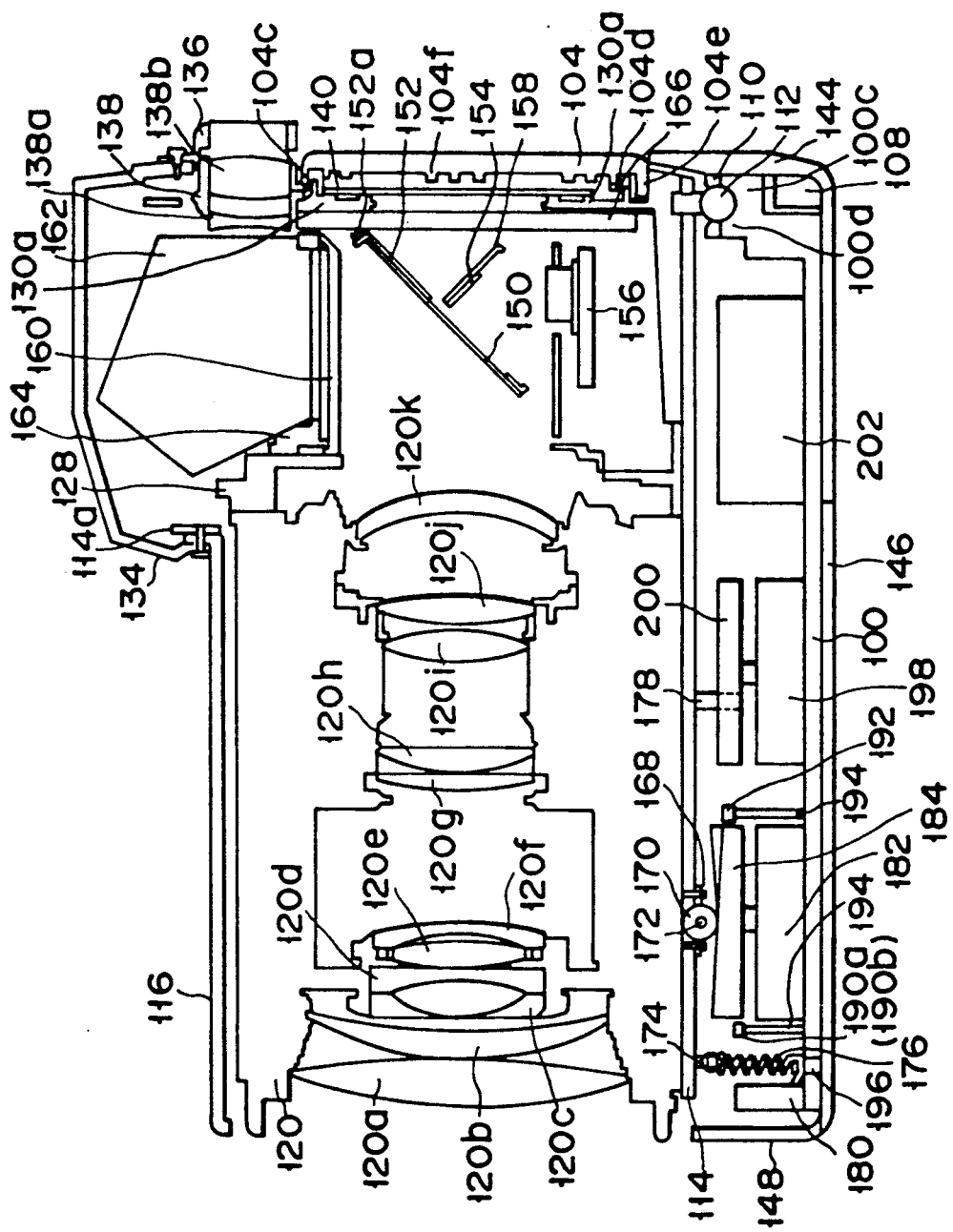
FIG. 1 is a schematic longitudinal sectional side view showing an internal structure of a camera employing an optical system vibro-isolating apparatus according to the first embodiment of the present invention.
Figure 2:
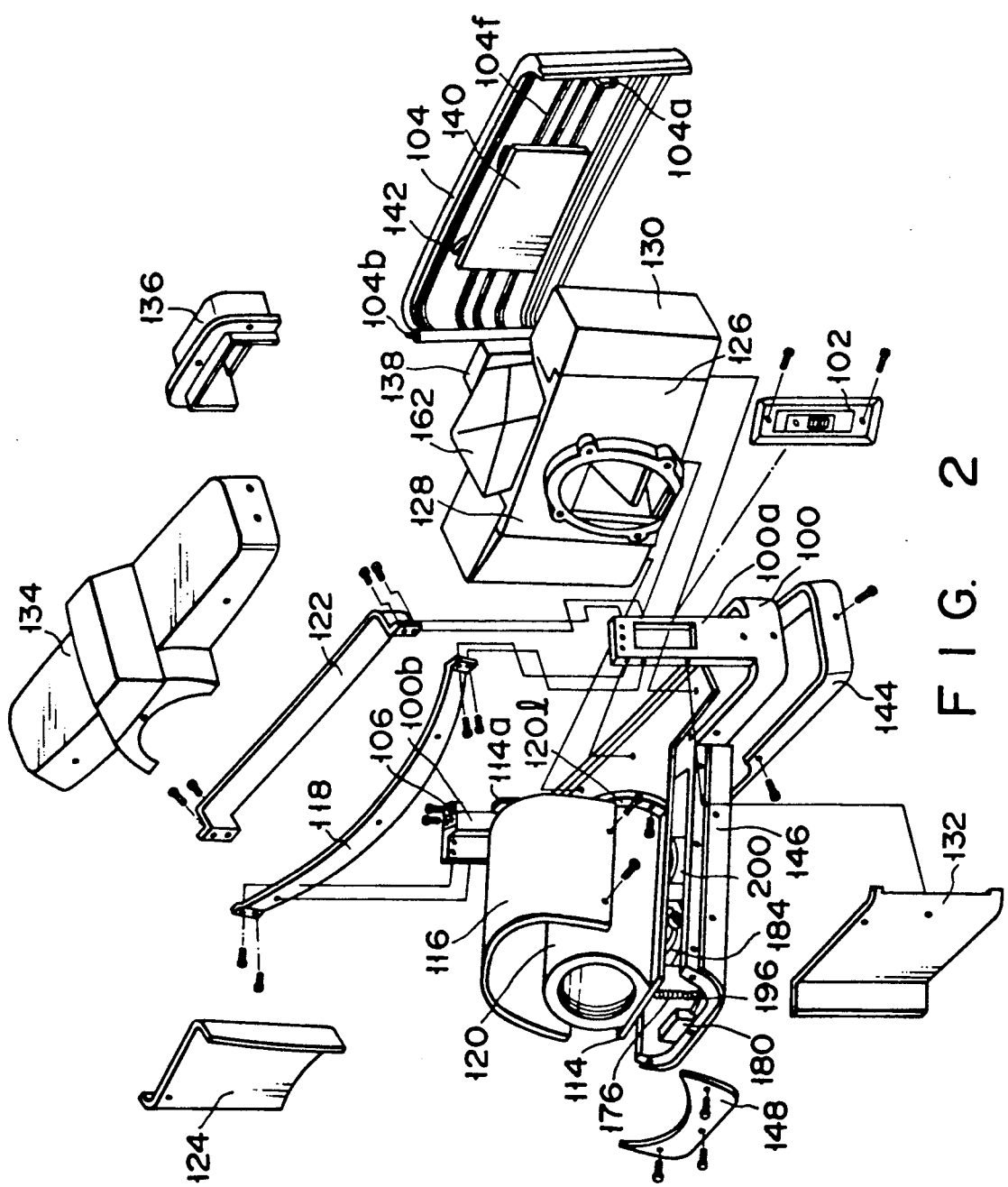
FIG. 2 is an exploded perspective view showing a casing structure of the camera shown in FIG. 1.

FIG. 1 shows an internal structure of a camera which employs an optical system vibro-isolating apparatus according to an embodiment of the present invention, and FIG. 2 shows a casing structure of the camera shown in FIG. 1.

A holding member 100 made of, e.g., an aluminum die cast material or a high-strength plastic molded material is formed to have an almost T shape and is used to maintain the strength of the camera. The holding member 100 has an upright portion 100a at its one end. The upright portion 100a is used to mount an opening/closing lock unit 102 of a rear lid 104 of the camera. A rectangular hole is formed in the upright portion 100a. When the opening/closing lock unit 102 is mounted outside the upright portion 100a, part of the opening/closing lock unit 102 is inserted and extends inside the upright portion 100a through this hole. An opening/closing lock mechanism comprises an extending mechanism portion and a lock member 104a of the rear lid 104 which is engaged with the extending mechanism portion.

An upright portion 100b is formed at the other end of the T-shaped holding member 100. A hinge seat 106 serving as an opening/closing fulcrum is fixed on the upper surface of the upright portion 100b by screws. A hinge seat (not shown) for supporting a pair of rotating shaft projections 104b of the rear lid 104 is fixed below the hinge seat 106 so as to be paired therewith.

A high edge is formed on the T-shaped outer circumferential surface of the holding member 100. This edge has a central recess to increase the rigidity of the casing of the camera as a whole. A plurality of mounting holes are formed in the circumferential surface of the holding member 100.

As shown in FIG. 1, an upright portion 100d and a stepped portion 100c for storing an acceleration sensor 108 are formed on the T-shaped central film-side surface of the holding member 100. As shown in FIG. 3, a smooth semispherical bearing surface 100e and mounting holes 100f for fixing a press plate 110 are formed on the upper end surface of the upright portion 100d. The press plate 110 comprises a cylindrical member having a hole 110a at its center, and portions 110b extending from both ends of this cylindrical member. Mounting holes 110c are formed in the extended portions 110b to mount the press plate 110 to the holding member 100. A smooth semispherical bearing surface 110d is formed on the central lower surface of the press plate 110, i.e., the lower surface of the cylindrical member.

As shown in FIG. 3, a support shaft 112 has a spherical member, one end portion of which is a thread portion 112a. The support shaft 112 is clamped between the holding member 100 and the press plate 110 by screws and is not removed therefrom. The spherical surface of the support shaft 112 is fitted with the bearing surface 100e of the holding member 100 and the spherical shape of the bearing surface 110d of the press plate 110 with a very small gap. Therefore, the support shaft 112 is clamped to be smoothly pivoted without any play by the bearing surfaces 100e and 110d. The thread portion 112a of the support shaft 112 is threadably engaged and fixed on a first structural member 114.

As shown in FIG. 2, a tunnel-like lens barrel casing member 116 partially having an R surface has an upright portion 116a at one end corresponding to the film side. A mounting hole is formed in the upright portion 116a to mount it to a first holding arm 118. Mounting holes are formed at both sides of the bottom portions of the lens barrel casing member 116 to mount it to the holding member 100. When the lens barrel casing member 116 is mounted on the holding member 100 and the first holding arm 118 by fixing screws into the corresponding mounting holes, a predetermined gap is formed between the lens barrel casing member 116 and a lens frame 120 of the camera.

The first holding arm 118 is a member constituted by an arcuated central portion and flat end portions. Two mounting holes for fixing the first holding arm 118 to the holding member 100 and for mounting the casing member 116 are formed at each end portion of the first holding arm 118. When the first holding arm 118 is integrally fixed on the holding member 100, it serves as a supporting reinforcing member so as to prevent deformation upon exertion of an external force on casing members including the lens barrel casing member 116.

A second holding arm 122 is a plate member having Z-shaped bent portions at both ends. The second holding arm 122 is fixed to the holding member 100 through mounting holes in these bent portions. In practice, the second holding arm 122 is screwed on the holding member 100 and serves as a supporting reinforcing member to prevent deformation or the like when an external force is exerted on the casing members in the same manner as the first holding arm 118.

A right casing member 124 is fixed to the first holding arm 118 and the holding member 100 by screws. In this case, the right casing member 124 is fixed to assure a predetermined gap with a camera body mechanism block 126 and the lens barrel frame 120. The camera body mechanism block 126 represents a mechanism unit obtained by mounting camera actuating mechanisms (e.g., a camera winding mechanism, a mirror mechanism, and a finder mechanism) on a second structural member 128 and a third structural member 130. A left casing member 132 is fixed on the first holding arm 118 and the holding member 100 by screws and is prevented from deformation as in the right casing member 124. The left casing member 132 is fixed to assure a predetermined gap with the camera body mechanism block 126 and the lens barrel frame 120.

An upper cover 134 of the camera is fixed to the first holding arm 118, the second holding arm 122, and the upright portions 100a and 100b of the holding member 100. At this time, the upper cover 134 is fixed to assure a predetermined gap with the camera body mechanism block 126 in the same manner as other casing members.

An eyepiece frame cover 136 is integrally fixed on the rear end face of the upper cover 134 so as to assure a predetermined gap with an eyepiece frame 138 of the camera body mechanism block 126.

Steps 104c, 104d, and 104e are formed on the rear lid 104 so as to surround the edge of the lid, thereby preventing leakage of light. The pair of rotating shaft projections 104b for the opening/closing hinges mounted by the known method described above, and the opening/closing lock member 104a are arranged at one end of the rear lid 104. The rear lid 104 is made of a high-strength plastic molded body, and reinforcing ribs 104f are formed inside the rear lid 104.

A film press plate 140 is mounted on the rear lid 104 to maintain a film at a predetermined position. This film press plate 140 is elastically held by a leaf spring 142. The film press plate 140 is brought into tight contact with upper and lower press plate rail surfaces 130a of the third structural member 130 by a compression force of the leaf spring 142.

A first bottom plate 144 having a high peripheral upright portion and a partial notch is fixed on the holding member 100 to cover the film-side bottom surface of the holding member 100. A second bottom plate 146 is fixed on the holding member 100 to cover the lens-side bottom surface of the holding member 100. A third bottom plate 148 is fixed on the holding member 100 below the distal end of the lens of the camera and is fixed to assure a predetermined gap with the distal end of the lens barrel frame 120.

The internal structure of the camera will be mainly described with reference to FIG. 1. The so-called lens barrel frame 120 has an auto-focus mechanism, a motored zoom mechanism, an aperture mechanism, a close-focus (proximity photographing), and the like which are interlocked by an interlocking mechanism (not shown). Photographing lenses 120a to 120k are incorporated in the lens barrel frame 120, and their positional relationship is changed in accordance with an auto-focus, zoom or micro photographic mode, thereby allowing a predetermined photographic operation. The lens barrel frame 120 has an arcuated projection 120l (FIG. 2) like a collar and is fixed by screws to the second structural member 128 of the camera body mechanism block 126 to maintain its mechanical strength.

The reinforcing members for the camera body mechanism block 126 comprise the second structural member 128 and the third structural member 130 which are assembled with screws to constitute an integral body. The third structural member 130 and the lens barrel frame 120 in addition to the second structural member 128 are assembled together with the first structural member 114 by screws. The first, second, and third structural members 114, 128, and 130 are made of an aluminum die cast material or a high-strength plastic material and have a sufficient mechanism strength.

A single-lens reflex movable mirror 150 and a movable mirror frame 152 which supports the movable mirror 150 and has a pivotal center 152a at one end thereof are mounted on the film side of the photographic lens 120k. A splitting mirror 154 is mounted in the movable mirror frame 152 to guide light to an auto-focus sensor 156. The splitting mirror 154 is held by a splitting mirror frame 158 which supports the splitting mirror 154 and retracts it from the optical path during a photographic operation. These movable mirror mechanism and auto-focus mirror mechanism are arranged and retracted from the photographic path in synchronism with a camera release by a known method.

Light passing through the photographic lenses is reflected by the movable mirror 150 and is focused on a finder screen 160. A photographing person can observe a photographic image focused on the finder screen 160 through a penta prism 162 and eyepieces 138a and 138b. The finder screen 160 and the penta prism 162 are held by a prism frame 164. The prism frame 164 is held on the second structural member 128 by a known single-lens reflex technique. The eyepieces 138a and 138b are fixed on an eyepiece frame 138, and the eyepiece frame 138 is integrally fixed on the second structural member 128.

A focal plane shutter 166 is arranged on the film side of the movable mirror 150. The shutter 166 is arranged to be opened or closed by a driver (not shown) to perform light exposure by a known method.

The lens barrel frame 120 is fixed on the first structural member 114. The first structural member 114 comprises an almost T-shaped plate member (FIG. 2) having mounting holes and is formed to fix the second and third structural members 128 and 130.

As shown in FIGS. 4A and 4B, a roller bearing 168 for holding a roller 170 and a roller shaft 172 is fixed below each of the right and left ends of the first structural member 114. Mounting holes 168a and 168b are formed in the roller bearing 168 at its both ends. A female screw which is threadably engaged with the roller shaft 172 is formed at the center of the roller bearing 168. The roller shaft 172 is a stepped screw having a thread portion at its one end and partially having a step which is engaged with the roller 170. The roller shaft 172 pivotally supports the roller 170 in the roller bearing 168 without a play.

As shown in FIG. 1, spring lock 174 extends near the lens-side front end of the first structural member 114 to fix the hook portion of a spring 176. A guide shaft 178 extends near the central bottom surface portion of the first structural member 114 in the direction of the bottom surface to perform yaw-direction control.

The support shaft 112 is fixed without a play by threadable engagement almost below the film surface of the first structural member 114. The first structural member 114, the second structural member 128, and the third structural member 130 can be smoothly pivoted without a play in the pitching and yaw directions. Therefor, the lens barrel frame 120 and the camera body mechanism block 126 which are fixed to the first, second, and third structural members 114, 128, and 130 can be smoothly pivoted without a play in the pitching and yaw directions.

An acceleration sensor 180 for detecting a vibration of the camera at the lens-side front end is fixed on a flat recess of the upper surface of the holding member 100. A first ultrasonic motor (USM) 182 is fixed below almost the optical axis on the film-surface side of the acceleration sensor 180. A bearing 184a (FIG. 5A) to be fixed to the output shaft of the USM 182 is arranged at the center of a stereoscopic cam 184. The stereoscopic cam 184 is clamped by the bearing 184a in a direction perpendicular to the output shaft of the USM 182 and can be rotated together with it.

An optical signal 186 and a magnetic signal 188 are recorded in the circumferential surface of the stereoscopic cam 184 to perform rotational control. Photoreflectors (limit sensors) 190a and 190b for reading the optical signal 186 and a magnetic sensor 192 for reading the magnetic signal 188 are located to be spaced apart from the circumferential surface of the cam 184 by a predetermined distance (see FIGS. 18A and 18B for further details). The photoreflectors 190a and 190b and the magnetic sensor 192 are fixed on a mounting base 194 for performing fine adjustment of the height and distance of the circumferential surface of the stereoscopic cam 184. The other end of the mounting base 194 is fixed to the holding member 100.

As shown in FIG. 5B, two cam surfaces 184b which change from a maximum lift amount to a minimum lift amount upon 180° rotation of the USM 182 are formed on the upper surface of the stereoscopic cam 184. The rollers 170 are in rolling contact with the cam surfaces 184b, so that the first structural member 114 can be vertically moved through the roller 170 upon rotation of the USM 182.

As shown in FIG. 5B, the rollers 170 are slightly pivoted along an arc having a radius R since yaw-direction pivotal movement about the support shaft 112 is performed by a second USM (to be described later). At this time, the rollers 170 are slightly inclined on the cam surfaces 184b to follow the arc having the radius R, so as to minimize pitch-direction pivotal movement upon deviations of the rollers 170 from the cam surfaces 184b. The cam surface 184b of the stereoscopic cam 184 has a shape so that the contact surfaces of the two rollers 170 have identical cam lift amounts.

The cam surface 184b causes vertical movement of the first structural member 114 in accordance with the rotational direction and amount of the first USM 182 controlled in association with camera vibration signals (to be described later) from the acceleration sensors. The vibrations of the lens barrel frame 120 and the camera body mechanism block 126 fixed on the first structural member 114 ca be corrected.

As shown in FIG. 1, another spring lock 196 extends near the lens-side distal end of the holding member 100 below the spring lock 174 extending on the first structural member 114. The tension spring 176 is hooked between the spring locks 174 and 196 to keep each roller 170 and the stereoscopic cam 184 in contact with each other. This spring 176 provides a tension enough to prevent the roller 17 from being separated from the stereoscopic cam 184.

Figure 6A:
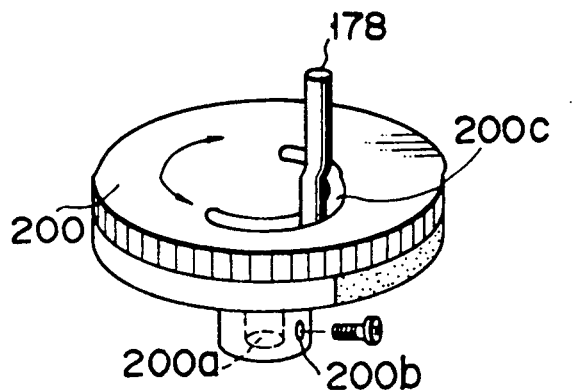
FIG. 6A is a perspective view showing a structure of a cam fixed on a second ultrasonic motor.

A second ultrasonic motor (USM) 198 is fixed to the holding member 100. A cam 200 shown in FIG. 6A is fixed on the output shaft of the second USM 198. A cylindrical projection for fixing the output shaft of the second USM 198 is formed at the lower central portion of the cam 200. A fitting hole 200a engaged with the output shaft and a clamp screw mounting hole 200b for fixing the output shaft and the cam 200 are formed in the projection. The cam 200 is fixed on the output shaft with a clamp screw. A groove 200c having a predetermined width is formed on the cam 200. The distance between the groove 200c and the center of the cam is changed upon rotation of the cam 200.

Figure 7:
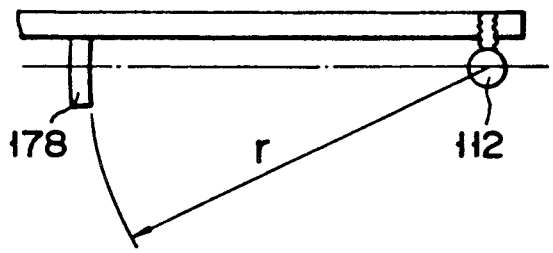
FIG. 7 is a view for explaining a guide shaft fitted in a groove formed in the cam shown in FIG. 6A.

The guide shaft 178 fitted in the groove 200c of the cam 200 is fixed on the first structural member 114. As shown in FIG. 7, the guide shaft 178 is fitted in the groove 200c with a small gap so that the guide shaft 178 can be smoothly slid in the cam groove 200c formed by an arc having an equidistance r from the center of the support shaft 112. When the first structural member 114 is vertically swung upon pivotal movement of the stereoscopic cam 184, the distance r between the guide shaft 178 and the support shaft 112 is kept unchanged even if the guide shaft 178 is vertically swung in the cam groove 200c. Therefore, there is no fear of causing an operation error of the guide shaft 178 in the groove 200c. In addition, the guide shaft 178 has a sufficient length not to cause removal of the guide shaft 178 from the cam groove 200c.

The guide shaft 178 on the arc is exemplified to assure the operation. However, if the distance r between the support shaft 112 and the guide shaft 178 is assured to be a predetermined value or more, the guide shaft 178 may comprise a linear member which can be properly operated in a small space between the cam groove 200c and the guide shaft 178 under the condition that a camera vibro-isolating mechanism for preventing the vibrations within the range of about 1° to 2° is employed.

When the second USM 198 is rotated, the guide shaft 178 is guided along the cam groove 200c of the cam 200, so that a distance from the output shaft of the second USM 198 is changed. In this case, the first structural member 114 is pivoted about the support shaft 112 in the yaw direction. On the other hand, the guide shaft 178 and the cam groove 200c has strengths and sliding characteristics which can allow smooth sliding while supporting the camera weight.

As shown in FIG. 1, control unit 202 comprising acceleration signal processing circuits and USM drive control circuits is arranged almost below the second structural member 128 in the holding member 100. This control unit 202 represents signal processing circuits and drive control circuits (both will be described later) which correct the camera vibrations according to the present invention. More specifically, the control unit 202 comprises signal processing and drive control circuits in a vertical camera vibration elimination part and the same circuits in a horizontal camera vibration elimination part.

Figure 8:
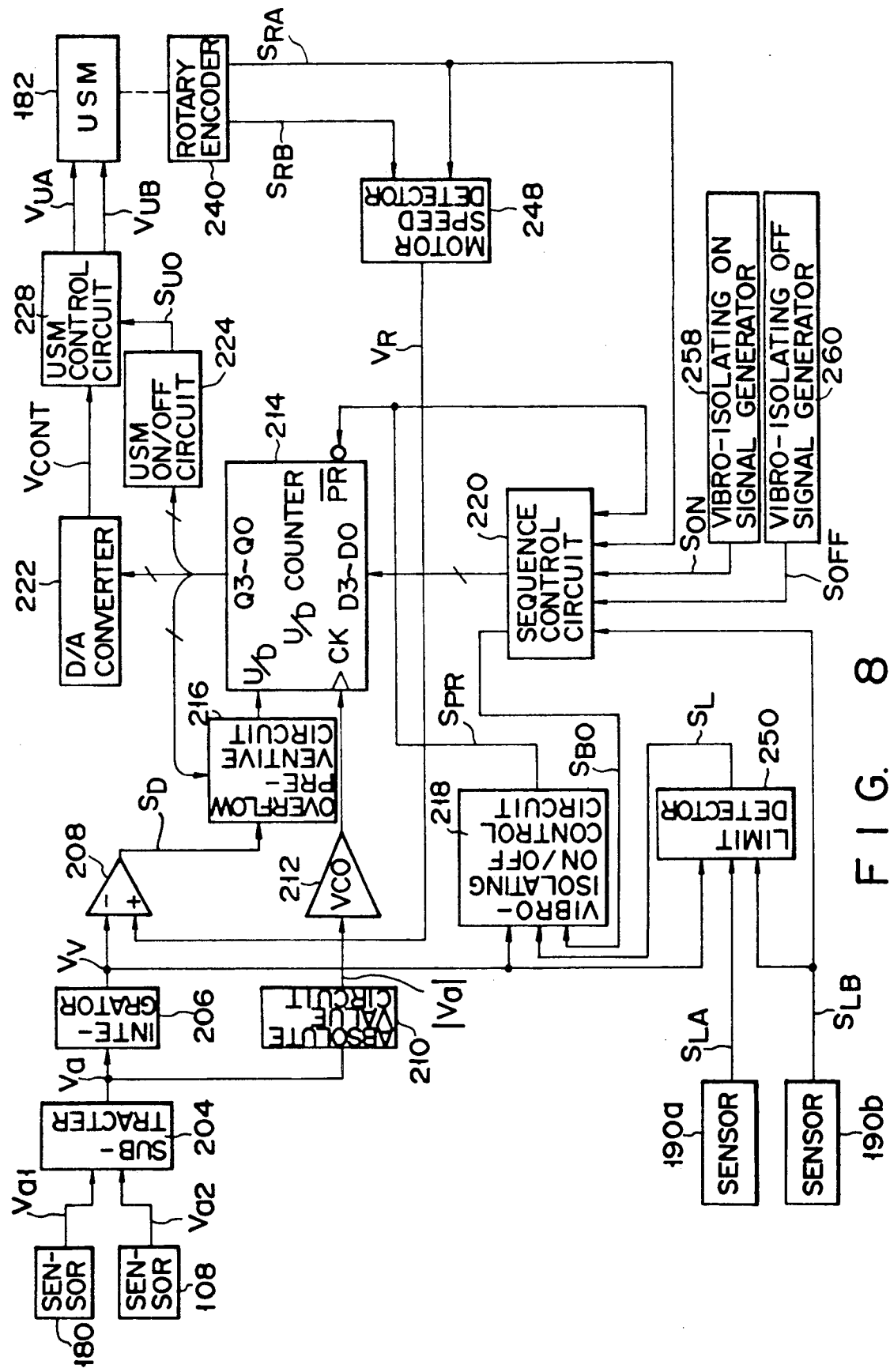
FIG. 8 is a block diagram showing a control unit.

Arrangements of the respective components of the control unit 202 will be described with reference to the block diagram in FIG. 8. The vertical camera vibration elimination part will be described, and the same arrangement as the vertical camera vibration elimination part can be similarly used to the horizontal camera vibration elimination part. The acceleration sensors 108 and 180 for detecting the camera vibrations are arranged at the frontmost and rearmost portions of the camera in FIG. 1. The sensitivity direction of these acceleration sensors 108 and 180 is the vertical direction. Each acceleration sensor outputs, as the camera vibration signal, a positive voltage when an upward acceleration acts on the camera and outputs a negative voltage when a downward acceleration acts on the camera.

A subtracter 204 outputs a difference between outputs from the acceleration sensor 108 and 180. That is, if the outputs from the acceleration sensor 180, the acceleration sensor 108, and the subtracter 204 are defined as $V_{a1}$, $V_{a2}$, and $V_a$, respectively, relation $V_a = -V_{a1} - V_{a2}$ is established. The signal $V_a$ represents an acceleration of vertical rotational motion of the camera. Assume that the acceleration sensor 180 receives an upward acceleration and that the acceleration sensor 108 receives a downward acceleration. In this case, since $V_{a1} > 0$ and $V_{a2} < 0$, $V_a > 0$. This indicates that the vertical rotation of the camera is accelerated upward.

Figure 9A:
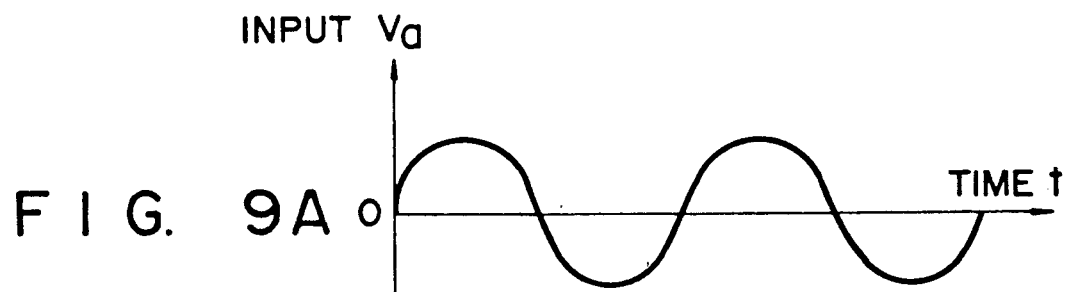
FIG. 9A is a waveform chart showing an input to an integrator.
Figure 9B:
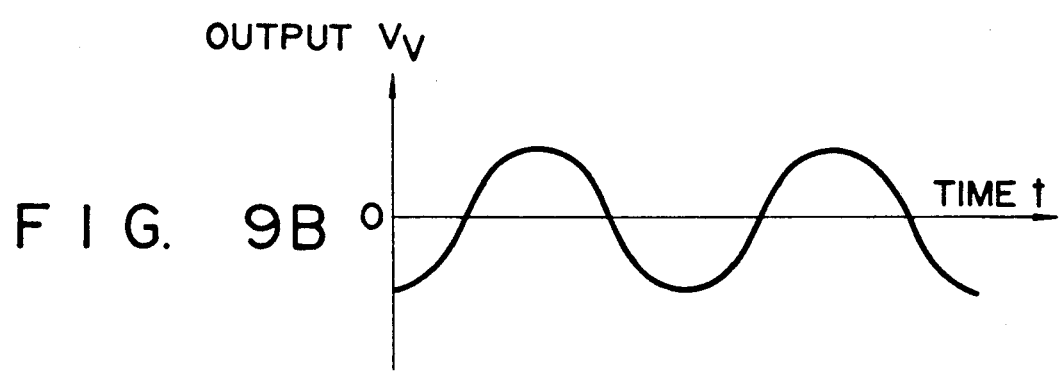
FIG. 9B is a waveform chart showing an output from the integrator.

The acceleration signal $V_a$ is input to an integrator 206 and is converted into a speed signal $V_v$. Input and output waveforms of the integrator 206 are shown in FIGS. 9A and 9B, respectively. In this case, since the input $V_a$ has a sinusoidal wave, the output also has a sinusoidal wave but its phase is delayed from the input by 90°.

A comparator 208 compares the speed signal $V_v$ with a signal $V_R$ (to be described later) representing the speed of the first USM 182 and outputs a comparison signal as a digital signal $S_D$ (count direction signal). That is, when the motor speed signal $V_R >$ speed signal $V_v$, the digital signal $S_D$ is at "H" (high level). However, when $V_R < V_v$, then $S_D =$ "L" (low level).

Figure 10A:
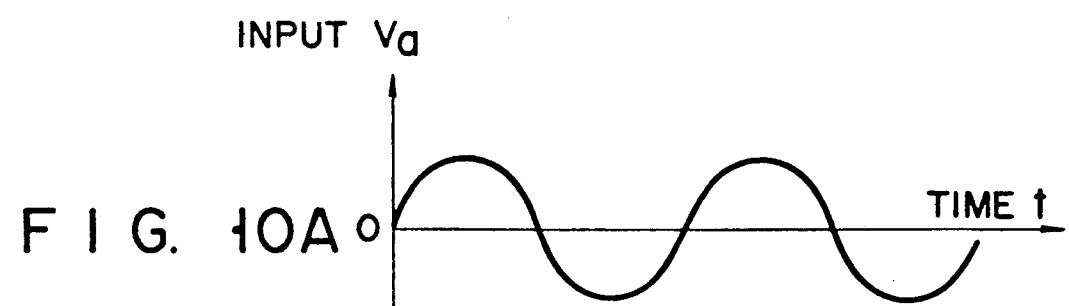
FIG. 10A is a waveform chart showing an input to an absolute value circuit.
Figure 10B:
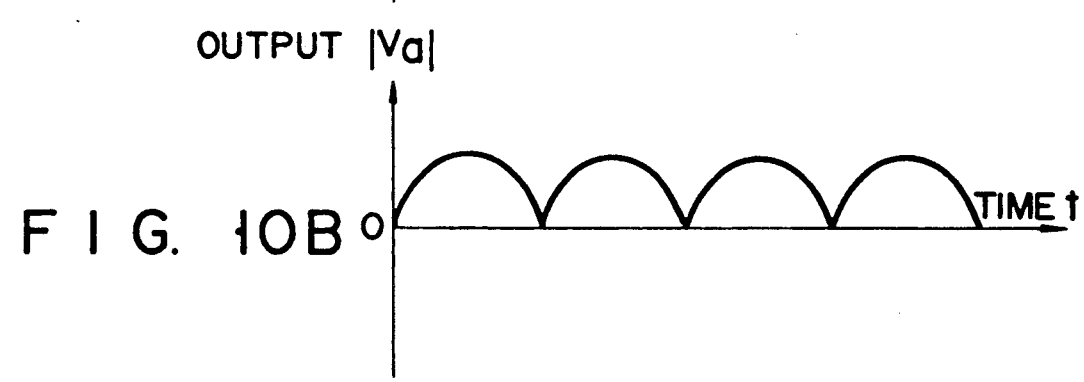
FIG. 10B is a waveform chart showing an output from the absolute value circuit.

An absolute value circuit 210 receives the acceleration signal $V_a$ and outputs its absolute value $|V_a|$. Input and output waveforms of the absolute value circuit 210 are shown in FIGS. 10A and 10B, respectively.

A voltage-controlled oscillator (VCO) 212 receives the absolute value $|V_a|$ of the acceleration signal $V_a$ and outputs pulses having a frequency proportional to the input $|V_a|$ voltage. That is, the VCO 212 outputs pulses having a low frequency when the voltage $|V_a|$ is small. When the voltage $|V_a|$ is large, the VCO 212 outputs pulses having a high frequency.

A 4-bit up/down (U/D) counter 214 has an up/down count switching terminal U/D, a clock input terminal CK, present terminal PR, and preset value input terminals D3 to D0 as input terminals, and count value output terminals Q3 to Q0 as output terminals. When a signal input to the up/down count switching terminal U/D is set at "L" level, an up count mode is selected. However, when this input signal is set at "H" level, a down count mode is selected. The input terminal U/D is connected to the output of the comparator 208 through an overflow preventive circuit 216 (to be described later). The clock input terminal CK is connected to the output of the VCO 212, and counting is performed at a leading edge of each input pulse.

The U/D counter 214 performs a normal counting operation when a signal input to its preset terminal PR is set at "H" level. When this preset input signal is set at "L", the counter 124 performs a preset operation. The preset operation is to set a value (binary value) input to the preset value input terminals D3 to D0 as a count value regardless of the clocks input to the clock input terminal CK. Reference symbol D3 denotes a most significant bit (MSB) of the preset value; and D0, a least significant bit (LSB) of the value. For example, assume that "H"=1 and "L"=0, and the preset operation is performed for the preset value (D3, D2, D1, D0) as (H, L, L, L)=(1, 0, 0, 0). In this case, the count value (Q3, Q2, Q1, Q1) is set to be (1, 0, 0, 0) regardless of the value currently set in the counter 214 or a clock input. In this case, reference symbol Q3 denotes an MSB of the count value; and Q0, its LSB.

The preset terminal PR is connected to the output terminal of a vibro-isolating ON/OF control circuit 218 (to be described later). The output terminal of the vibro-isolating ON/OFF control circuit 218 is also connected to the input of a sequence control circuit 220 (to be also described later). The preset value terminals D3 to D0 are connected to the output terminal of the sequence control circuit 220. The count value output terminals Q3 to Q0 output the count value (Q3, Q2, Q1, Q0) set in the counter 214 and are connected to the overflow preventive circuit 216, a digital/analog (D/A) converter 222, and a USM ON/OFF circuit 224.

The overflow preventive circuit 216 prevents an overflow of the counter 214, and its detailed arrangement is shown in FIG. 11. The overflow preventive circuit 216 causes an AND.OR circuit 226 to switch to the output Q3 from the counter 214 itself when the count value (Q3, Q2, Q1, Q0) from the counter 214 becomes (0, 0, 0, 0) or (1, 1, 1, 1). Otherwise, i.e., except for the count value (Q3, Q2, Q1, Q0) of (0, 0, 0, 0) or (1, 1, 1, 1), the overflow preventive circuit 216 supplies the normal count direction signal $S_D$, i.e., the output from the comparator 208, to the terminal U/D of the counter 214. When the count value (Q3, Q2, Q1, Q0) is (0, 0, 0, 0), the terminal U/D of the counter 214 receives Q3="0"="L" by the AND OR circuit 226, and the mode of the counter 214 is set in the up count mode. When the count value (Q3, Q2, Q1, Q0)=(1, 1, 1, 1), then the terminal U/D receives Q3="1"="H", and the mode of the counter 214 is set in the down count mode. That is, the overflow preventive circuit 216 prevents an overflow, i.e., a change from (0, 0, 0, 0) to (1, 1, 1, 1) or from (1, 1, 1, 1) to (0, 0, 0, 0) of the counter 214.

The input of the D/A converter 222 is connected to the count value output terminals Q3 to Q0 of the counter 214, and the output of the D/A converter 222 is connected to the control terminal of a USM control circuit (to be described later) 228. The D/A converter 222 outputs an analog signal $V_{CONT}$ (control voltage) proportional to the digital input value (Q3, Q2, Q1, Q0). The input/output characteristics of the D/A converter 222 are shown in FIG. 12. More specifically, when the count value (Q3, Q2, Q1, Q0) of the counter 214 is (1, 0, 0, 0), the output $V_{CONT}$ from the D/A converter 222 becomes 0 V. When the count value is (1, 0, 0, 1) or more, the D/A converter 222 outputs a positive voltage. When the count value is (0, 1, 1, 1) or less, the D/A converter 222 outputs a negative voltage.

Figure 13:
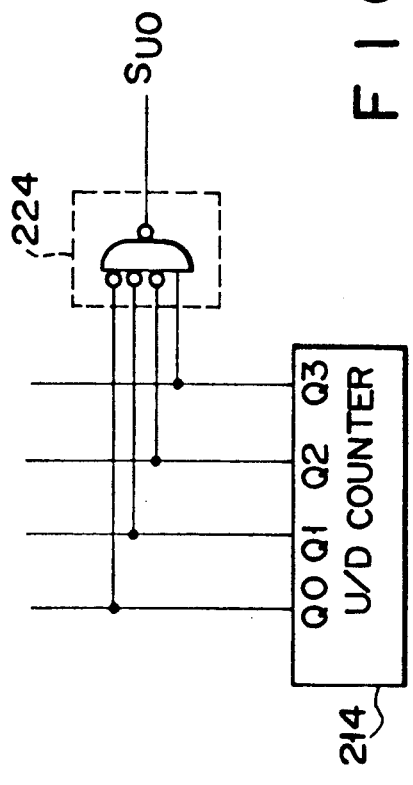
FIG. 13 is a diagram showing an ultrasonic motor (USM) ON/OFF circuit.

In the USM ON/OFF circuit 224 for sending an USM ON/OFF signal $S_{UO}$ to the USM control circuit 228, the input of the USM ON/OFF circuit 224 is connected to the count value output terminals Q3 to Q0 of the counter 214, and the output of the USM ON/OFF circuit 224 is connected to the USM control circuit terminal of the USM control circuit 228. FIG. 13 shows a detailed arrangement of the USM ON/OFF circuit 224. Only when the count value (Q3, Q2, Q1, Q0) from the counter 214 is (1, 0, 0, 0), an output from the USM ON/OFF circuit 224, i.e., the USM ON/OFF signal $S_{UO}$ is set at "L" level. Otherwise, this signal is set at "H" level. The USM control circuit 228 stops the USM 182 when the USM ON/OFF signal $S_{UO}$ is set at "L" level and energizes the USM 182 when the USM ON/OFF signal $S_{UO}$ is set at "H" level. As a result, only when the count value (Q3, Q2, Q1, Q0) from the counter 214 is (1, 0, 0, 0), the USM 182 is stopped. Otherwise, the USM 182 is operated.

The USM control circuit 228 is a circuit for controlling the USM 182 serving as an actuator in the vibro-isolating mechanism. The USM control circuit 228 has a control terminal and an USM ON/OFF terminal as input terminals and 2-phase USM drive terminals as output terminals. The control terminal receives the control voltage $V_{CONT}$ output from the D/A converter 222, the USM ON/OFF terminal receives the USM ON/OFF signal $S_{UO}$ output from the USM ON/OFF circuit 224. The outputs from the USM control circuit 228 are connected to the USM 182.

Figure 14:
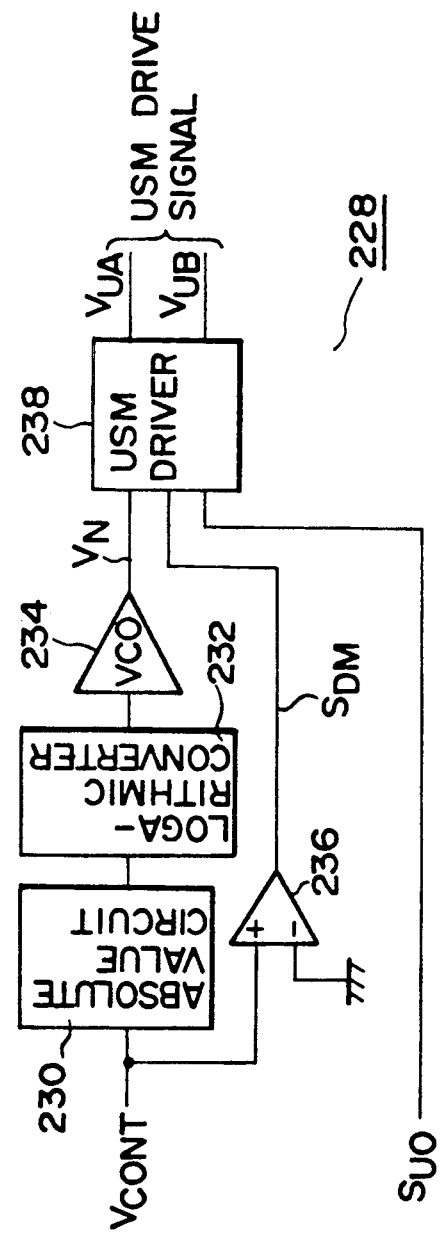
FIG. 14 is a diagram showing a USM control circuit.

FIG. 14 shows a detailed block diagram of the USM control circuit 228. The USM control circuit 228 comprises an absolute value circuit 230, a logarithmic converter 232, a VCO 234, a comparator 236, and a USM driver 238. The control voltage $V_{CONT}$ input from the control terminal is input to the absolute value circuit 230 and the comparator 236. An output $|V_{CONT}|$ from the absolute value circuit 230 is input to the logarithmic converter 232 and is converted into a logarithmic value. The reason why the logarithmic converter 232 is arranged in the USM control circuit 228 will be described later.

The VCO 234 receives an output from the logarithmic converter 232 and outputs pulses (motor speed control signal $V_N$) having a frequency $f_N$ proportional to this input voltage. The relationship between $f_N$ and the speed N of the USM 182 is shown in FIG. 15A. The relationship between $f_N$ and $|V_{CONT}|$ is shown in FIG. 15B. As shown in FIG. 15B, when the $|V_{CONT}|$ value is small, e.g., when $|V_{CONT}|=V_2$, a curve has a large gradient. A rate of change in $f_N$ corresponding to a change in $|V_{CONT}|$ is large. To the contrary, when the $|V_{CONT}|$ value is large, e.g., when $|V_{CONT}|=V_1$, the curve has a small gradient, and a rate of change in $f_N$ corresponding to a change in $|V_{CONT}|$ is small.

As described above, the output from the VCO 234, i.e., the motor speed control signal $V_N$, is input to the USM driver 238. On the other hand, the comparator 236 determines a sign of the control voltage $V_{CONT}$ and outputs a rotational direction control signal $S_{DM}$ to the USM driver 238. That is, if $V_{CONT}>0$, then $S_{DM}$="L". In addition, the USM ON/OFF signal $S_{UO}$ output from the USM ON/OFF circuit 224 is also input to the USM driver 238.

Figure 16A:
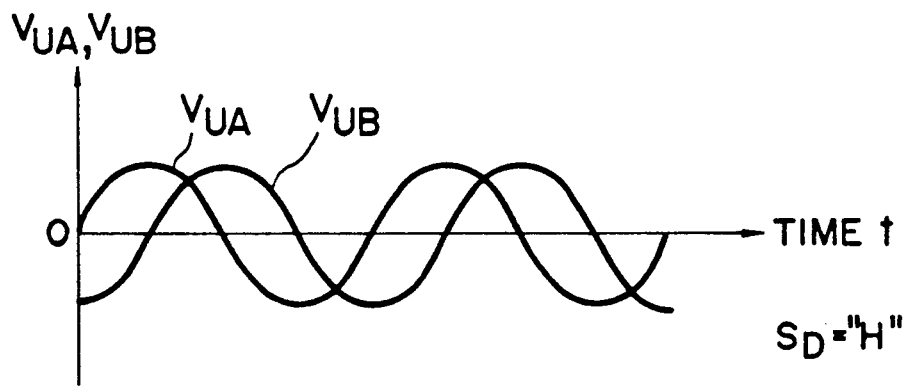
FIGS. 16A and 16B are graphs showing relationships between phases of USM drive signals.
Figure 16B:
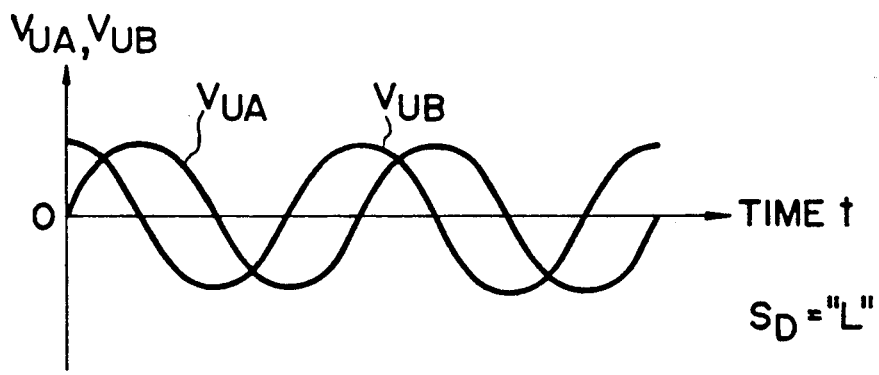

The USM driver 238 receives the three signals, i.e., the motor speed control signal $V_N$, the rotational direction control signal $S_{DM}$, and the USM ON/OFF signal $S_{UO}$ and outputs 2-phase USM drive signals $V_{UA}$ and $V_{UB}$. The motor speed control signal $V_N$ is power-amplified and is output as the 2-phase USM drive signals $V_{UA}$ and $V_{UB}$ having a phase difference of 90°. At this time, the frequency of each of the signals $V_{UA}$ and $V_{UB}$ is the same as the frequency $f_N$ of the signal $V_N$. The speed of the USM 182 is controlled by this frequency, i.e., the drive frequency $f_N$. A phase relationship (delay or advance) between the signals $V_{UA}$ and $V_{UB}$ is determined by the rotational direction control signal $S_{DM}$, thereby determining the rotational direction of the USM 182. This state is shown in FIGS. 16A and 16B. When $S_{DM}$ is "H", then the phase of the signal $V_{UA}$ is advanced from that of the signal $V_{UB}$ by 90°, as shown in FIG. 16A. In this case, the USM 182 is rotated clockwise (CW). However, when $S_{DM}$="L", then the phase of the signal $V_{UB}$ is advanced from that of the signal $V_{UA}$ by 90°, as shown in FIG. 16B. In this case, the USM 182 is rotated counterclockwise (CCW).

The USM ON/OFF signal $S_{UO}$ is used to turn on/off the USM driver 238. That is, when $S_{UO}$="H", then the USM driver 238 is operated as described above and outputs the USM drive signals $V_{UA}$ and $U_{UB}$. However, when $S_{UO}$="L", the driver 238 does not output the signals $U_{UA}$ and $U_{UB}$. As a result, the USM 182 is operated for $U_{UO}$="H" and is stopped for $S_{UO}$="L".

Figure 17:
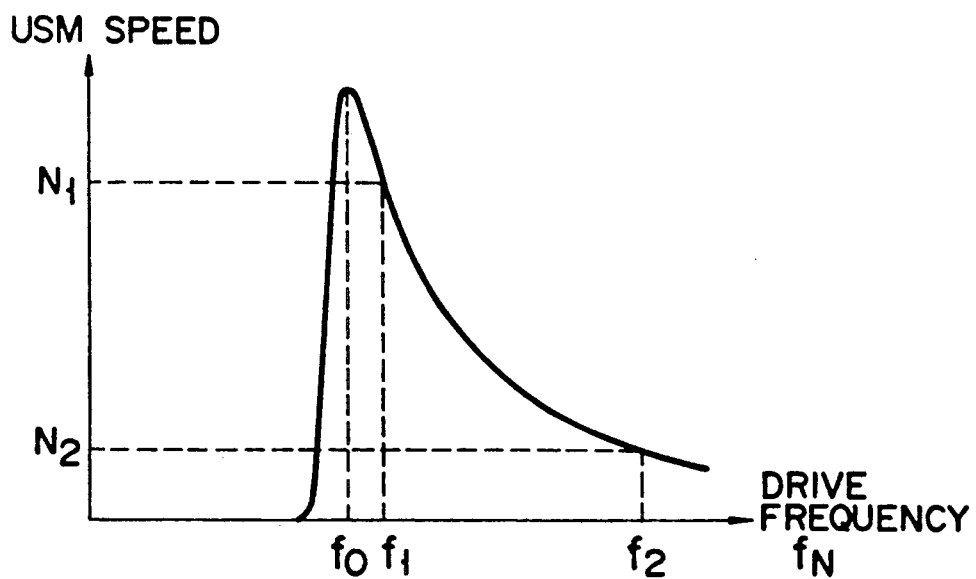
FIG. 17 is a graph showing characteristics of a relationship between a USM drive frequency and a USM speed.

The first USM 182 is a reversible motor used as a vibro-isolating actuator. In this embodiment, a traveling wave type USM is used. However, any reversible ultrasonic motor having another system may be used. The speed, rotational direction, and the ON/OFF state of the USM 182 are controlled by the USM control circuit 228. Various speed control schemes are available, such as a method of changing a drive voltage to control the motor speed, or a method of changing phases of the 2-phase drive signals to control the motor speed. In this embodiment, the drive frequency $f_N$ is changed to control the motor speed. FIG. 17 shows a relationship between the drive frequency $f_N$ and the motor speed N (non-load state) of the USM 182. When the USM 182 is driven at a drive frequency $f_1$ higher than its resonant frequency $f_0$ but near $f_0$, the USM 182 is rotated at a high speed $N_1$. However, when the USM 182 is driven at a frequency $f_2$ having a large difference from the resonant frequency $f_0$, its speed is decreased as $N_2$. When the drive frequency $f_N$ is equal to or less than the resonant frequency $f_0$, the USM 182 is stopped. In this sense, the frequency $f_N$ must be $f_0$ or more. That is, speed control is performed within the range between the drive frequencies $f_1$ and $f_2$.

A characteristic phenomenon of a scheme for controlling the motor speed N upon a change in the drive frequency $f_N$ is a change in rate of change in N occurs with respect to the change in $f_N$. That is, when the drive frequency $f_N$ is as low as $f_1$ (near the resonant frequency $f_0$), a rate of change in motor speed N with a change in $f_N$ is large. However, when the drive frequency $f_N$ is as high as $f_2$ (a frequency having a large difference from $f_0$), a rate of change in N with a change in $f_N$ is small. This phenomenon does not pose any serious problem when the USM is rotated at a constant speed. However, when the speed of the USM must be sequentially changed as in an vibro-isolating operation, the phenomenon poses a serious problem. This problem will be described with reference to the operation below.

A rotary encoder 240 connected to the rotating shaft of the USM 182 outputs two different phase pulses $S_{RA}$ and $S_{RB}$ having a 90° phase difference upon rotation of the USM 182. In this embodiment, the rotary encoder 240 comprises a magnetic encoder for outputting 1000 pulses per revolution.

Figure 18A:
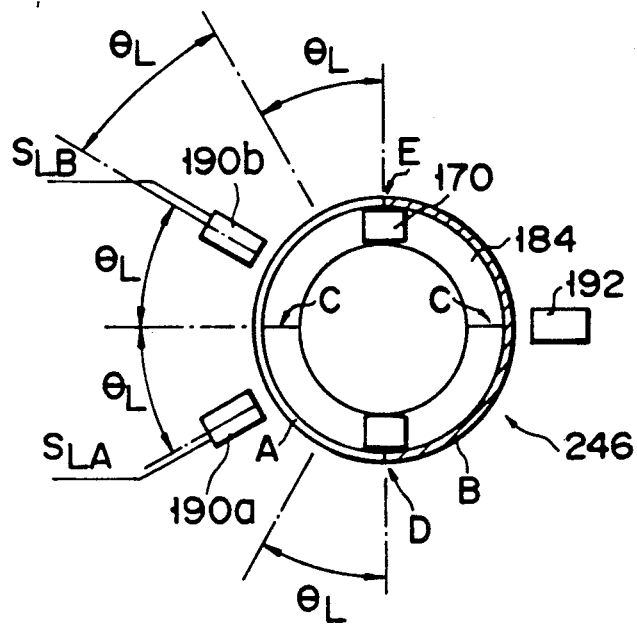
FIG. 18A is a side view showing a layout of a rotary encoder and a limit sensor.
Figure 18B:
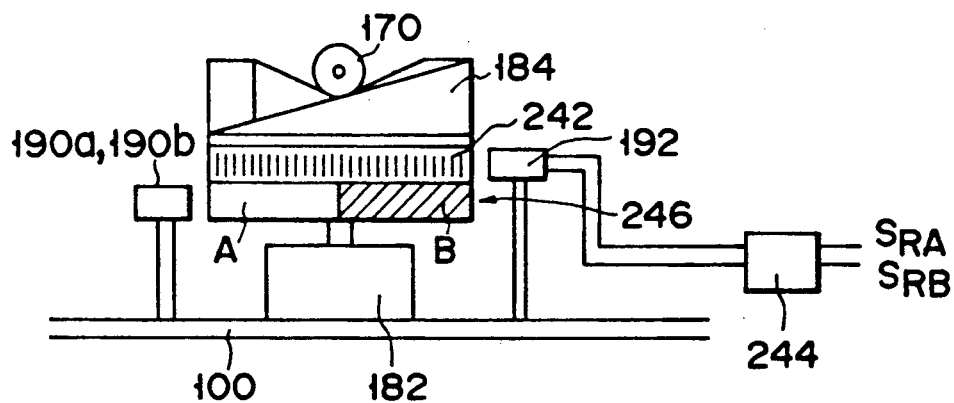
FIG. 18B is a plan view of FIG. 18A.

The arrangement of the rotary encoder 240 is shown in FIG. 18B. This rotary encoder 240 comprises a magnetic drum 242, a magnetic sensor 192, and a waveshaper 244. The magnetic drum 242 and a reflector 246 of a photoreflector (to be described later) are mounted on the lower portion of the stereoscopic cam 184 and are rotated together with the ca 184. N and S poles are alternately formed on the side surface of the magnetic drum 242. The magnetic sensor 192 is located at a position opposite to the magnetization surface of the magnetic drum 242 and detects a change in magnetic field upon rotation of the magnetic drum 242 The magnetic sensor 192 outputs two phase signals having a 90° phase difference. The waveshaper 244 waveshapes these signals and outputs the digital signals $S_{RA}$ and $S_{RB}$.

The rotary encoder 240 outputs pulses having a high frequency when the speed of the USM 182 is high, but outputs pulses having a low frequency when the speed of the USM 182 is low. In addition, the phase relationship (phase advance or delay relationship) between the two output signals is changed in accordance with a change in rotational direction. More specifically, when the USM 182 is rotated in the CW direction, the phase of the signal $S_{RA}$ is advanced from that of the signal $S_{RB}$, as shown in FIG. 19A. To the contrary, when the USM 182 is rotated in the CCW direction, the phase of the signal $S_{RB}$ is advanced from that of the signal $S_{RA}$, as shown in FIG. 19B.

A motor speed detector 248 receives the phase pulses $S_{RA}$ and $S_{RB}$ output from the rotary encoder 240 and outputs the analog signal $V_R$ (motor speed signal) representing the speed of the USM 182. That is, the motor speed detector 248 measures the frequencies of the signals $S_{RA}$ and $S_{RB}$ and converts the measured frequencies into analog voltages (the absolute value of the output $V_R$ is proportional to the frequencies of the $S_{RA}$ and $S_{RB}$). The motor speed detector 248 also detects a rotational direction of the USM 182 in accordance with the phase relationship between the signals $S_{RA}$ and $S_{RB}$ and determines a sign of the output $V_R$. That is, when the USM 182 is rotated in the CW direction, the phase of the signal $S_{RA}$ from the rotary encoder 240 is advanced from that of the signal $S_{VB}$ therefrom, and the output $V_R$ from the motor speed detector 248 becomes a positive value. To the contrary, when the USM 182 is rotated in the CCW direction, the phase of the output $S_{RB}$ from the rotary encoder 240 is advanced from that of the signal $S_{RA}$ therefrom, and the output $V_R$ becomes a negative value. As described above, the motor speed signal $V_R$ as an output from the motor speed detector 248 is sent to the comparator 208.

The limit sensors 190a and 190b are used to detect limit angles of the stereoscopic cam 184 in the CW and CCW directions, respectively. When each limit sensor detects that the stereoscopic cam 184 reaches the corresponding limit position, the USM 182 is stopped. In this embodiment, photoreflectors are used as the limit sensors 190a and 190b, respectively. More specifically, the limit sensor 190a detects the limit in the CW direction, while the limit sensor 190b detects the limit in the CCW direction.

The layout of the limit sensors 190a and 190b is shown in FIGS. 18A and 18B. The reflector 246 serving as a photoreflector is mounted together with the magnetic drum 242 in the lower portion of the stereoscopic cam 184 and is rotated together with the cam 184. The region A (corresponding to a 180° range) of the reflector 246 serves as a surface having a high reflectance for infrared rays, while the region B serves as a surface having a low reflectance for infrared rays. The limit sensors 190a and 190b emit infrared rays and detect reflected components. When the limit sensor opposes the region A of the reflector 246, it outputs a signal of "L" level. However, when the sensor opposes the region B, it outputs a signal of "H" level. The limits of the stereoscopic cam 184 are defined when the rollers 170 reach the steps C of the stereoscopic cam 184. The steps C are portions at the terminal portions of the two cam surfaces of the stereoscopic cam 184.

When the stereoscopic cam 184 is rotated until the rollers 170 run over the steps C, a positional relationship between the angular position of the stereoscopic cam 184 and the lift amount of each roller 170 is lost, or the rollers 170 abut against the steps C and rotation of the cam 184 is interrupted. Therefore, the USM 182 must be forcibly stopped before the rollers 170 reach the steps C. When the limit sensors 190a and 190b are arranged at positions, as shown in FIG. 18A, one of the outputs from the limit sensors 190a and 190b becomes "H" level when an angle formed between the shaft of the roller 170 and the corresponding step C becomes $\theta_L$. Reference symbols D and E in FIG. 18A denote boundary points between the reflectors and the limit sensors 190a and 190b.

When the stereoscopic cam 184 is continuously rotated in the CW direction, and the point D of the reflector 246 reaches a position opposite to the limit sensor 190a, the output from the limit sensor 190a is changed from "L" level to "H" level. When the stereoscopic cam 184 is rotated in the CCW direction, and the point E of the reflector 246 reaches a position opposite to the limit sensor 190b, the output from the limit sensor 190b is changed from "L" level to "H" level. When one of the outputs from the limit sensors 190a and 190b is set at "H" level, the USM 182 is forcibly stopped, and the rollers 170 will not run over the steps C. The angle $\theta_L$ is determined to be an appropriate angle in accordance with the size of the roller 170 and the stop precision of the USM 182.

A limit detector 250 receives outputs $S_{LA}$ and $S_{LB}$ from the limit sensors 190a and 190b and the speed signal $V_v$ from the integrator 206 and outputs a limit stop signal $S_L$. The limit stop signal $S_L$ is input to the vibro-isolating ON/OFF control circuit 218 (to be described in detail later). A detailed arrangement of the limit detector 250 is shown in FIG. 20. When $S_{LA}$="H" and $V_v>0$, then $S_L=1$.

Figure 21:
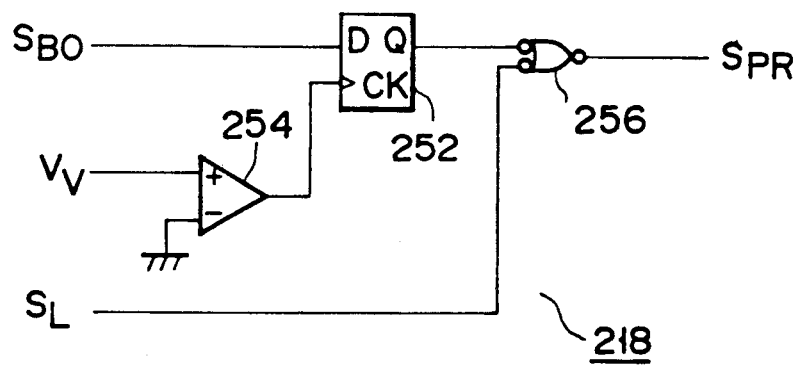
FIG. 21 is a diagram showing an arrangement of a vibro-isolating ON/OFF control circuit.

The vibro-isolating ON/OFF control circuit 218 receives the speed signal $V_v$, the limit stop signal $S_L$, and the vibro-isolating ON/OFF signal $S_{BO}$ output from the sequence control circuit 220 (to be described in detail later), and outputs the preset signal $S_{PR}$. The preset signal $S_{PR}$ is input to the preset terminal PR of the U/D counter 214 and the sequence control circuit 220. A detailed arrangement of the vibro-isolating ON/OFF control circuit 218 is shown in FIG. 21. The vibro-isolating ON/OFF control circuit 218 comprises a D-type flip-flop 252, a comparator 254, and a NOR gate 256. The vibro-isolating ON/OFF signal $S_{BO}$ is input to an input D of the flip-flop 252. The speed signal $V_v$ is input to the noninverting input terminal of the comparator 254. The output of the comparator 254 is connected to a clock input CK of the flip-flop 252. The output of the comparator 254 is changed from "L" level to "H" level when the value of the speed signal $V_v$ is changed from a negative value to a positive value. In this case, a state at the input D of the flip-flop 252 appears as a Q output. The preset signal $S_{PR}$ as an output from the NOR gate 256 is set at "L" level when one of the Q output from the flip-flop 252 and the limit stop signal $S_L$ is set at "L" level.

The sequence control circuit 220 controls the overall sequence of the vibro-isolating operation. In this embodiment, the sequence control circuit 220 comprises a microcomputer. The inputs to the sequence control circuit 220 are the output $S_{LB}$ from the limit sensor 190b, the output $S_{RA}$ from the rotary encoder 240, the output, i.e., the preset signal $S_{PR}$ from the vibro-isolating ON/OFF control circuit 218, a vibro-isolating ON signal $S_{ON}$ from a vibro-isolating ON signal generator 258, and a vibro-isolating OFF signal $S_{OFF}$ output from a vibro-isolating OFF signal generator 260. The outputs from the sequence control circuit 220 are the vibro-isolating ON/OFF signal $S_{BO}$ and the preset value bits D3 to D0 input to the counter 214.

The vibro-isolating ON signal generator 258 outputs the vibro-isolating ON signal $S_{ON}$ when, e.g., the first release switch of the camera is turned on. The vibro-isolating OFF signal generator 260 outputs the vibro-isolating OFF signal $S_{OFF}$ by e.g., a shutter closing completion detection switch.

The preset value (D3, D2, D1, D0) output from the sequence control circuit 220 is normally set as (1, 0, 0, 0). When the vibro-isolating ON signal $S_{ON}$ is input, the sequence control circuit 220 changes the logic level of the vibro-isolating ON/OFF signal $S_{BO}$ from "L" to "H" so as to start a vibro-isolating operation. When the sequence control circuit 220 receives the vibro-isolating OFF signal $S_{OFF}$, it changes the logic level of the vibro-isolating ON/OFF signal $S_{BO}$ from "H" to "L" so as to stop the vibro-isolating operation. The stop of the vibro-isolating operation can be confirmed by the preset signal $S_{PR}$.

When the stop of the vibro-isolating operation is confirmed, i.e., when the preset signal $S_{PR}$ is changed from "H" to "L", the sequence control circuit 220 performs an initialization operation. First, the sequence control circuit 220 changes the preset value (D3, D2, D1, D0) supplied to the counter 214 to a value (e.g., (0, 1, 1, 1)) smaller than (1, 0, 0, 0). By this operation, the stereoscopic cam 184 can be rotated in the CCW direction. When the stereoscopic cam 184 is continuously rotated in the CCW direction, the boundary E in FIG. 18A reaches a position opposite to the limit sensor 190b, and the output $S_{LB}$ from the limit sensor 190b is changed from "L" to "H". The sequence control circuit 220 detects this change in logic level and changes the preset value (D3, D2, D1, D0) to a value (e.g., (1, 0, 0, 1) larger than the value (1, 0, 0, 0). In this case, the stereoscopic cam 184 is rotated in the CW direction. Then, the rotary encoder 240 outputs pulses. The sequence control circuit 220 counts these pulses. When the roller 170 reaches an intermediate portion of the slope of the stereoscopic cam 184, i.e., the position indicated in FIG. 18A, rotation of the cam 184 is stopped. That is, the cam 184 is rotated by an angle $\theta_1$ in the CW direction from the $\theta_L$ position at which the boundary E opposes the limit sensor 190b. Since the number of output pulses from the rotary encoder 240 is proportional to a rotational angle, this rotational angle can be detected upon counting of the pulses. Finally, in order to stop the cam 184, the preset value (D3, D2, D1, D0) is returned to (1, 0, 0, 0).

An operation of a camera incorporating the optical system vibro-isolating apparatus having the above arrangement will be described below. A state prior to the start of vibro-isolating operation will be described with reference to FIG. 1. As previously mentioned, the lens barrel frame 120 serving as the main camera mechanism, the finder mechanism, the mirror mechanism, the winding mechanism mounted on the third structural member 130, and the like are mounted on the first structural member 114. These members are vertically and horizontally pivotal about the support shaft 112. The lens barrel frame 120 and the camera body mechanism block 126 mounted on the first structural member 114 are supported together with the casing members 116, 124, 132, 134, 136, 144, 146, and 148 with predetermined gaps (this has been described previously).

Prior to the start of vibro-isolating operation, the stereoscopic cam 184 is located at the initial position shown in FIG. 18A, i.e., a position where each roller 170 is located at an intermediate position of the slope of the cam 184. This state indicates the stop position where the initialization has been completed.

Assume that a photographing person holds a camera at the ready and a vertical vibration occurs in the camera. Also assume that this vibration is a single vibration. When the vibro-isolating circuit is started in synchronism with an operation of an operation switch or release button of the camera, the acceleration sensors 108 and 180 detect vertical accelerations acting at the frontmost and rearmost portions of the camera and output signals $V_{a1}$ and $V_{a2}$. The subtracter 204 calculates a difference $V_a = V_{a1} - V_{a2}$. The value $V_a$ represents an acceleration of vertical rotation of the camera. The acceleration signal $V_a$ is converted into the speed signal $V_v$ by the integrator 206.

When the vibro-isolating ON signal $S_{ON}$ is input to the sequence control circuit 220 from the vibro-isolating ON signal generator 258 interlocked with the release switch of the camera, e.g., a two-step release switch or a mirror drive switch, the sequence control circuit 220 changes the vibro-isolating ON/OFF signal $S_{BO}$ from "L" to "H" to start the vibro-isolating operation.

Upon reception of the vibro-isolating ON/OFF signal $S_{BO}$ of "H" level, the vibro-isolating ON/OFF control circuit 218 changes the preset signal $S_{PR}$ from "L" to "H" when the speed signal $V_v$ is changed from a negative value to a positive value, i.e., when $V_v = 0$. The U/D counter 214 does not perform counting while the preset signal $S_{PR}$ input to the preset terminal PR is kept at "L" level. The counter 214 directly outputs the preset value (D3, D2, D1, D0) = (1, 0, 0, 0) output from the sequence control circuit 220 during this period. While the output (Q3, Q2, Q1, Q0) from the counter 214 is (1, 0, 0, 0), the USM ON/OFF signal $S_{UO}$ from the USM ON/OFF circuit 224 is kept at "L" level. As a result, the USM control circuit 228 does not output the USM drive signals $V_{UA}$ and $V_{UB}$. That is, the first USM 182 is in a stopped state.

When the preset signal $S_{PR}$ goes to "H" level, the counter 214 starts counting the pulses. In this case, the counter 214 performs a count-up or count-down operation. When the count value is deviated from the intermediate value (1, 0, 0, 0), the USM ON/OFF circuit 224 detects this deviation and changes the USM ON/OFF signal $S_{UO}$ from "L" level to "H" level. Upon reception of the USM ON/OFF signal $S_{UO}$, the USM control circuit 228 outputs the drive signals $V_{UA}$ and $V_{UB}$ to the USM 182, thereby rotating the USM 182. The motor operation is started at a moment corresponding to the speed signal $V_v = 0$ to minimize the delay of the motor operation since the speed signal $V_v = 0$ indicates a stop moment.

The count value from the counter 214 is converted into the control voltage $V_{CONT}$ by the D/A converter 222 and the converted signal is sent to the USM control circuit 228. Since the USM control circuit 228 outputs the drive signals $V_{UA}$ and $V_{UB}$ having the frequency $f_N$ corresponding to the control voltage $V_{CONT}$, the speed of the USM 182 is changed in correspondence with the $V_{CONT}$. Even if the count of the counter 214 is greatly changed and saturated, an abrupt change from the maximum count value to the minimum count value or vice versa can be prevented by the overflow preventive circuit 216, thereby preventing abrupt reverse rotation of the USM 182.

The USM control circuit 228 in this embodiment controls the speed of the USM 182 by changing the drive frequency $f_N$. As previously described, the drive frequency $f_N$ and the motor speed N do not have a linear relationship but an exponential relationship (FIG. 15A). Since it is assumed that the vibration has instantaneously changing speed and acceleration, the speed and acceleration of the USM 182 must also be instantaneously changed to correct this vibration. That is, a rate of change in speed N of the USM 182 is also controlled in the vibro-isolating apparatus of this embodiment. At this time, since the relationship between the drive frequency $f_N$ and the motor speed N is not linear, the relationship between the output from the counter 214 and the motor speed N is not linear, either. In this case, it is difficult to control a rate of change in motor speed N. The logarithmic converter 232 (FIG. 14) is inserted in the USM control circuit 228 to obtain an almost linear relationship between the output from the counter 214 and the motor speed N of the USM 182 (FIGS. 15A and 15B).

Strictly speaking, the motor speed N of the USM 182 is not uniquely determined to be one value if the output from the counter 214 is determined. The motor speed changes in accordance with the magnitude of a load acting on the USM 182. In order to control the motor speed N of the USM 182, the speed N must be detected and fed back to the control circuit. For this reason, the speed of the USM 182 is detected by the rotary encoder 240 connected to the rotating shaft of the USM 182 and the motor speed detector 248, and the motor speed signal $V_R$ is fed back. That is, the motor speed of the USM 182 is determined to cause the speed signal $V_v$ and the motor speed signal $V_R$ to coincide with each other by a feedback operation of a system constituted by the comparator 208, the counter 214, the D/A converter 222, the USM control circuit 228, the USM 182, the rotary encoder 240, and the motor speed detector 248.

The acceleration signal $V_a$ is converted by the absolute value circuit 210 and the VCO 212 into a pulse having a frequency proportional to the absolute value $|V_a|$. The converted pulse is input to the clock input terminal CK of the counter 214. That is, the count rate of the counter 214 is proportional to the absolute value $|V_a|$. As described above, since the output from the counter 214 and the motor speed N of the USM 182 have an almost linear relationship, a rate of change in motor speed N of the USM 182 can be determined. The rate of change in motor speed is the acceleration. In other words, the acceleration of the rotational movement of the USM 182 is controlled by the acceleration signal $V_a$. For example, when the rate of change in speed of the vibration, i.e., the acceleration is large, the frequency of clocks input to the counter 214 is increased. As a result, the rate of change in motor speed of the USM 182 is increased. To the contrary, when the acceleration of the vibration is small, the clock frequency of the counter 214 is decreased, and the rate of change in motor speed of the USM 182 becomes small.

When driving of the USM 182 is controlled by the camera vibration signals detected by the acceleration sensors, the stereoscopic cam 184 fixed on the output shaft of the USM 182 is pivoted. The rollers 170 are in rolling contact with the stereoscopic cam 184, and the first structural member 114 is vertically moved upon pivotal movement of the stereoscopic cam 184. Since the lens barrel frame 120 and the camera body mechanism block 126 are held on the first structural member 114, as described above, the vertical camera vibration can be corrected by pivotal control of the USM 182.

The operations of the limit sensors 190a and 190b and the limit detector 250 will be described with reference to FIGS. 18A, 18B, 20, and 22. As described above, the pivotal angle of the stereoscopic cam 184 is limited, and the vibro-isolating operation cannot be performed when the rollers 170 run over the steps C of the cam 184. In order to prevent this, an angle close to the limit angle is detected by the limit sensors 190a and 190b, and the limit sensors 190a and 190b output the signals $S_{LA}$ and $S_{LB}$. The signal $S_{LA}$ is output when a detected angle is close to the limit angle in the CW direction. The signal $S_{LB}$ is output when a detected angle is close to the limit angle in the CCW direction.

When the USM 182 is simply stopped upon an output of the signal $S_{LA}$ or $S_{LB}$ and the USM 182 is stopped, its operation cannot be started again, and the vibro-isolating operation is interrupted. For this reason, the limit detector 250 also inputs the speed signal $V_y$ and stops the USM 182 only when the detected angle is close to the limit angle and the motor is moving in the direction of limit.

Figure 22:
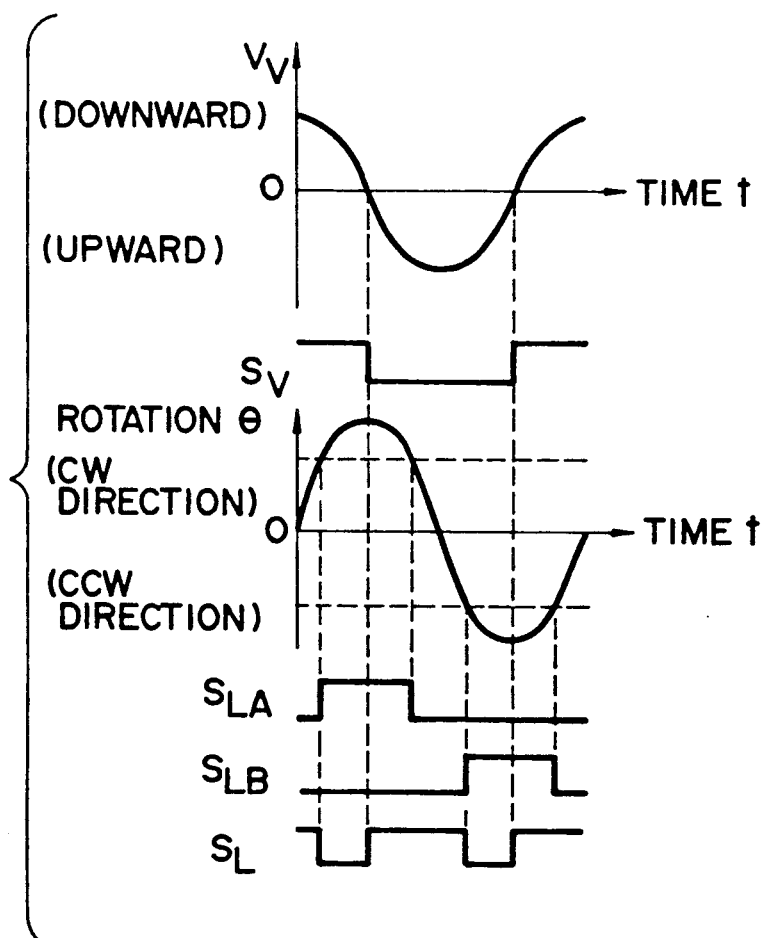
FIG. 22 is a waveform chart showing signals of the respective components to explain an operation of the limit detector.

Assume that a vibration exceeding a correctable vibration acts on the camera (FIG. 22). Assume that the camera is pivoted downward, the cam 184 is pivoted in the CW direction, its rotational angle reaches the limit angle, and the signal $S_{LA}$ is set at "H" level. At this time, since $V_y>0$, then the output $S_y$ (FIG. 20) from a comparator 262 in the limit detector 250 goes to "H" level, and the output $S_L$ from the limit detector 250 goes to "L" level. The USM 182 is stopped. When the camera is then pivoted upward, condition $V_y<0$ is established. The USM 182 is rotated in the CCW direction again. A similar operation is performed when the cam 184 reaches the limit in the opposite direction.

For the sake of simplicity, vertical correction for the vibro-isolating operation of the camera is confined to only a single vibration in the above description. The camera vibration is a kind of vibration and analytically is an aggregate of single vibrations. The camera vibration can be corrected according to the method of the present invention.

In the above description, vertical correction has been described. The camera vibration include vertical and horizontal components. As a matter of course, perfect camera vibration correction is provided when vibrations in the vertical and horizontal directions are corrected.

FIG. 23 is a front view of a camera according to the present invention. As described above, a control unit for correcting the horizontal vibration is arranged in the same manner as the vertical control unit according to the present invention. A third acceleration sensor 264 and a fourth acceleration sensor 266 for detecting a horizontal vibration are arranged on a horizontally extending arm of the holding member 100 in the lower portion of the camera. Outputs from the acceleration sensors 264 and 266 are processed through a subtracter in the horizontal camera vibration elimination part in the same manner as in the vertical acceleration sensors 108 and 180. The subsequent description will be omitted to prevent a repetitive description since it is similar to that of the vertical vibration correction. The second USM 198 is driven and controlled by a signal controlled by the control section 202.

As described above, since the cam 200 is fixed to the second USM 198 and the guide shaft 178 is inserted into the groove 200c, the guide shaft 178 is moved along the groove 200c upon pivotal movement of the second USM 198. At this time, the groove 200c has a cam shape which allows predetermined horizontal movement by a pivot amount of the second USM 198. Therefore, predetermined horizontal correction can be performed by the control signal.

In the above description, vertical vibration of the camera is corrected upon pivotal movement of the cam 184, and the horizontal vibration of the camera is corrected by the cam 200. The camera vibration amounts vary depending on individuals. In a normal photographic operation, the vibration amount corresponds to an image blurring of about 1 mm (maximum) on the screen. Displacement amounts of the two cams for camera vibration correction are small to correct the optical axis by 1° to 2°, thus correcting the camera vibration.

Figure 6B:
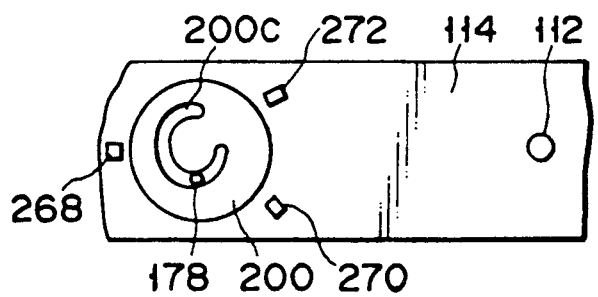
FIG. 6B is a plan view showing a peripheral portion of the cam shown in FIG. 6A.

The guide shaft 178 for correcting the horizontal vibration extends on the first structural member 114 which is swung by pivotal movement of the stereoscopic cam 184. Therefore, the guide shaft 178 slightly performs arcuated movement about the support shaft 112. At this time, slight sliding occurs between the guide shaft 178 and the cam groove 200c. As is apparent from the positional relationship between the support shaft 112, the guide shaft 178, and the cam groove 200c, as shown in FIG. 6B, since the cam groove 200c has an arcuated shape, even if the guide shaft 178 slightly performs horizontal arcuated movement upon pivotal movement of the stereoscopic cam 184, the guide shaft 178 is smoothly slid in the cam groove 200c without any play. Therefore, an actuation error does not occur.

FIG. 6B shows a periphery of the cam 200 when viewed from the lower side of the cam. A magnetic sensor 268 and limit sensors 270 and 272 are arranged around the cam 200 in the same manner as in the stereoscopic cam 184. The magnetic sensor 268 and the limit sensors 270 and 272 output drive control signals in the same manner as in the arrangement around the stereoscopic cam 184 in accordance with the same method as for vertical correction.

The first structural member 114 is pivoted horizontally about the support shaft 112 through the guide shaft 178 upon pivotal movement of the second USM 198 driven and controlled by the control unit 202 in correspondence with a horizontal vibration amount.

The camera vibro-isolating mechanism having the above arrangement is actuated, a camera shutter is closed, and exposure is completed. A vibro-isolating OFF signal $S_{OFF}$ is input to the sequence control circuit 220 from the vibro-isolating OFF signal generator 260 synchronized with the end of exposure. The sequence control circuit 220 receives the vibro-isolating OFF signal $S_{OFF}$ and sets the vibro-isolating ON/OFF signal $S_{BO}$ from "H" level to "L" level. The vibro-isolating ON/OFF control circuit 218 receives the signal $S_{BO}$ of "L" level and sets the preset signal $S_{PR}$ from "H" level to "L" level when the speed signal $V_v$ is changed from a negative value to a positive value. The signal $S_{PR}$ of "L" level is input to the preset terminal PR of the counter 214 to set the counter 214 in the preset mode, thereby stopping the USM 182.

When the vibro-isolating operation is completed, the initialization is started. When the sequence control circuit 220 receives the preset signal $S_{PR}$ and detects condition $S_{PR}=$"L", the initialization is performed to locate the rollers 170 at the centers of the slopes of the stereoscopic cam 184. Therefore, the next vibro-isolating operation can be started from the slope centers, and a vibro-isolating operation using a maximum actuation stroke of the stereoscopic cam 184 can be used.

This initialization is performed not only by the stereoscopic cam 184 but also by the cam 200 for correcting the horizontal vibration, thereby increasing the actuation range in the same manner as in vertical correction. When the initialization operation is performed prior to the mirror-down operation in the cam 200 in a single-lens reflex camera, blurring of a finder image by the initialization operation does not disturb the field of view of the photographing person.

The number of bits of the counter 214 is four in the above description, but is not limited to this. An 8- or 16-bit counter may used in place of the 4-bit counter. In the above embodiment, positive and negative power sources are used as power sources. However, a positive or negative power source may be used.

FIG. 24 shows another structure of a support shaft of a vibro-isolating mechanism. A first rotating shaft 274 is threadably engaged with the first structural member 114 and is rotatably supported on a second rotating shaft 276. The second rotating shaft 276 is fitted in a support member 278 and is supported to be pivotal in a direction perpendicular to a drawing surface. The support member 278 is screwed in the holding member 100. Therefore, the first structural member 114 can be pivoted about the two rotating shafts 274 and 276 in the X and Y directions.

The support shaft may be spherical, as described with reference to the above embodiment, or may be divided into X and Y rotating shafts in FIG. 24.

Figure 25:
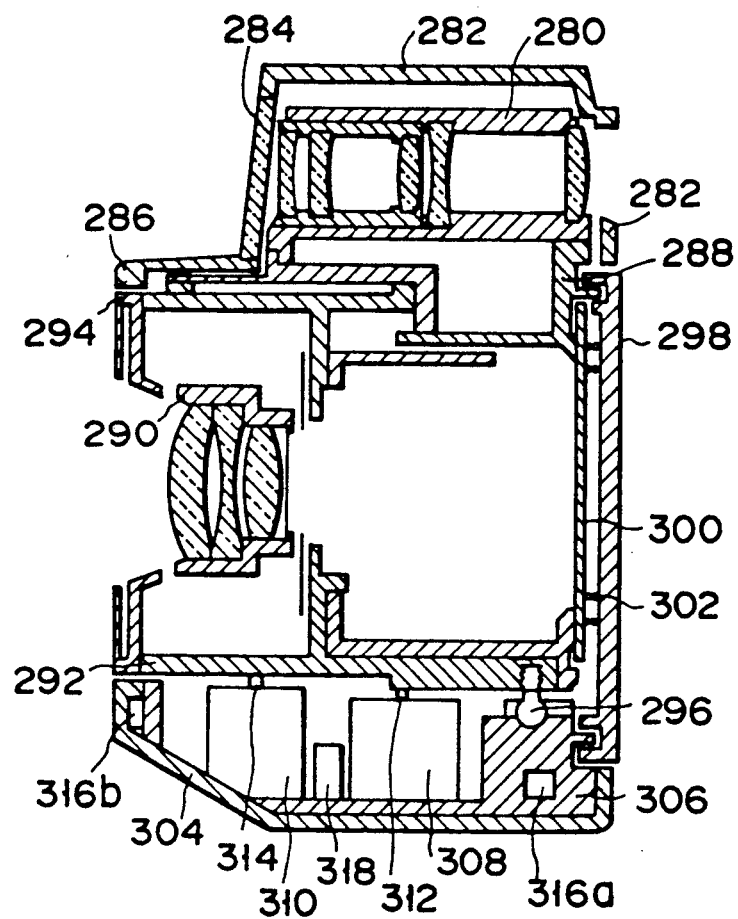
FIG. 25 is a schematic longitudinal sectional side view showing an internal structure of a camera employing an optical system vibro-isolating apparatus according to another embodiment of the present invention.

The second embodiment of the present invention will be described with reference to FIG. 25. In the first embodiment, a camera finder is of a single-lens reflex type. However, the present invention is not limited to a single-lens reflex camera, but is applicable to all photographic devices such as a range finder type compact camera and a still video camera. The second embodiment exemplifies a range finder type camera.

A camera finder frame 280 has a double structure interlocked with a zoom mechanism. A first casing member 282 and a finder window 284 are mounted on a second casing member 286 to be spaced apart from the finder frame 280 by a predetermined distance. The finder frame 280 is mounted on a structural member 288 which holds a photographic mechanism of the camera. A photographic lens assembly 290 is coupled to a mechanism (not shown) for causing a mechanism (not shown) for performing a series of photographic operations such as auto-focus and zoom operations. The photographic lens assembly 290 is then mounted on a first lens frame member 292. A second lens frame member 294 having a mechanism such as a lens barrier is mounted at the lens-side distal end of the first lens frame member 292. The first lens frame member 292 and the second lens frame member 294 at its lens-side distal end are mounted on the first casing member 282 with a predetermined distance therefrom.

A support shaft 296 is threadably engaged with the rear end portion of the first lens frame member 292. A three-dimensional pattern is formed on a rear lid 298 above the optical axis of the structural member 288 to prevent leakage of light. The rear lid 298 is held on the casing member by an opening/closing lock member (not shown) so as to maintain a gap with the structural member 288. A press plate 300 is movably mounted on the rear lid 298, so that the structural member 288 may be pressed by the press plate 200 through a press plate spring 302.

A third casing member 304 is located on the bottom surface of the camera and is mounted on a holding member 306 for maintaining a sufficient mechanism strength together with the second casing member 286 and the rear lid opening/closing lock member. The holding member 306 is engaged with the rear lid 298 at the film-side end. The three-dimensional pattern is formed on the holding member 306 to prevent leakage of light. When the rear lid 298 is closed, the film is not exposed with light. A ball joint bearing having the same structure as in the first embodiment is formed on the rear end surface of the holding member 306, so that the support shaft 296 can be rotated in four directions but is prevented from removal. An X-direction vibration correction mechanism 308 and a Y-direction vibration correction mechanism 310 are mounted on the holding member 306 in the same manner as in the first embodiment.

A first connecting mechanism 312 for the lens frame member 292 is connected to the X-direction vibration correction mechanism 308, and a second connecting mechanism 314 for the lens frame member 292 is connected to the Y-direction vibration correction mechanism 310. This camera also has acceleration sensors 316a and 316b, and a control unit 318 in the same manner as in the first embodiment. FIG. 25 shows the two acceleration sensors 316a and 316b. In this case, two acceleration sensors are arranged in each of the X and Y directions as in the first embodiment.

In the lens shutter camera, when a camera vibration occurs, this vibration is detected by the acceleration sensors, and the X- and Y-direction vibration correction mechanisms 308 and 310 are driven by a signal processed by the control unit 318. The lens frame member 292 is controlled and pivoted to correct the camera vibration.

When the vibration correction mechanisms are actuated as described above, the photographic device is pivoted about the support shaft 296. In this case, the structural member 288 slightly displaces the position of the press plate 300 connected to the rear lid 298 against the biasing force of the press plate spring 302, thereby correcting the vibration. Since the press plate 300 always urges the structural member 288 by the biasing force of the press plate spring 302, the structural member 288 does not float and can stably and continuously hold the film.

In the above embodiment, the pivot point is located below the optical axis of the camera. However, if the pivot center is located above the optical axis of the camera, i.e., near the eyepiece, a vibro-isolating mechanism which provides a higher performance can be obtained.

An image is shielded during exposure in an SLR finder. However, since a finger image can be observed during exposure in a range finder camera, the effect of the present invention can be enhanced in the range finder camera.

Figure 26:
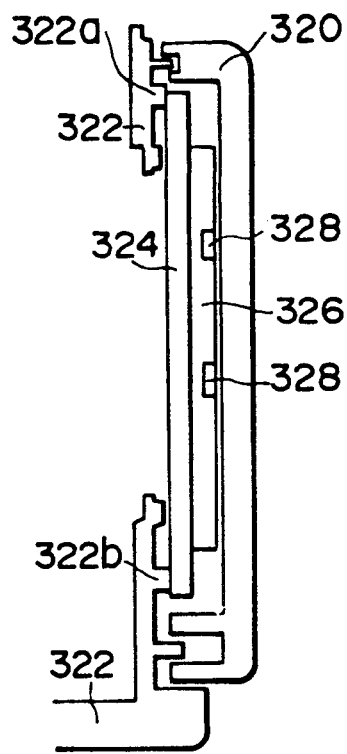
FIG. 26 is a longitudinal sectional side view showing a detailed structure of a rear lid portion.
Figure 27:
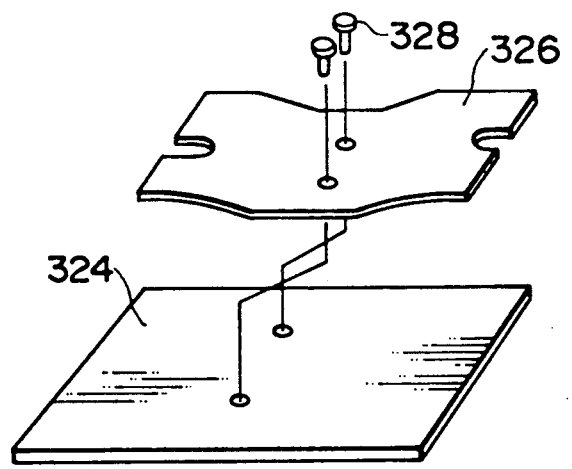
FIG. 27 is a perspective view showing a detailed structure of a press leaf spring.

FIG. 26 is a sectional view showing a detailed structure of a rear lid portion of this embodiment. As described above, a rear lid 320 is engaged with a structural member 322 of the photographic device with a predetermined distance so as to prevent leakage of light. A press plate 324 is in tight contact by a predetermined pressure with rail-like projections 322a and 322b located above and below the aperture of the structural member 322 by an elastic force of a press spring 326. The press spring 326 is fixed to the rear lid 320 by rivets 328, and its detailed structure is shown in FIG. 27. U-shaped notches are formed at the central end portions of the press plate spring 326 because the notches are engaged with projections (not shown) formed on the rear lid 320 so as to hold the press plate spring 326 with an elastic force.

Figure 28:
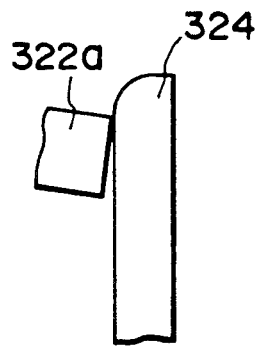
FIG. 28 is a view for explaining a structure obtained when a conventional press plate contact portion is used.

FIG. 28 is a view showing use of a conventional press plate contact portion. Rail-like projections each having a trapezoidal shape are formed on the camera body to be located above and below an aperture, thereby constituting a press plate surface. When the camera vibro-isolating mechanism is actuated to cause the structural member 322 to perform vibration correction in the range of several Hz to a frequency falling between 10 to 20 Hz, the rail projection 322a urges the press plate 324 at its corner edge to excessively wear the press plate 324, thereby posing a durability problem.

According to the present invention, as shown in FIG. 29A, when the rail-like projections 322a and 322b have R-shaped sections and even if the camera vibro-isolating mechanism is operated to vibrate the structural member 322, the press plate spring 326 properly functions to follow the movement of the structural member 322. Therefore, the load on the vibro-isolating mechanism by the biasing force of the press plate spring 326 can be reduced.

FIG. 29A shows contact portions between the press plate 324 and the rail-like projections 322a and 322b each having an arcuated distal end. FIG. 29A shows a state prior to the start of camera vibro-isolating operation. FIG. 29B shows a state wherein the camera vibro-isolating operation is performed, the rail-like projections 322a and 322b are pivoted about support shafts (not shown), and the press plate 324 is inclined by an angle $\theta$. In this case, since the distal ends of the rail-like projections 322a and 322b are arcuated, damage to the press plate 324 by the corner edges, as shown in FIG. 28, can be prevented.

Figure 30:
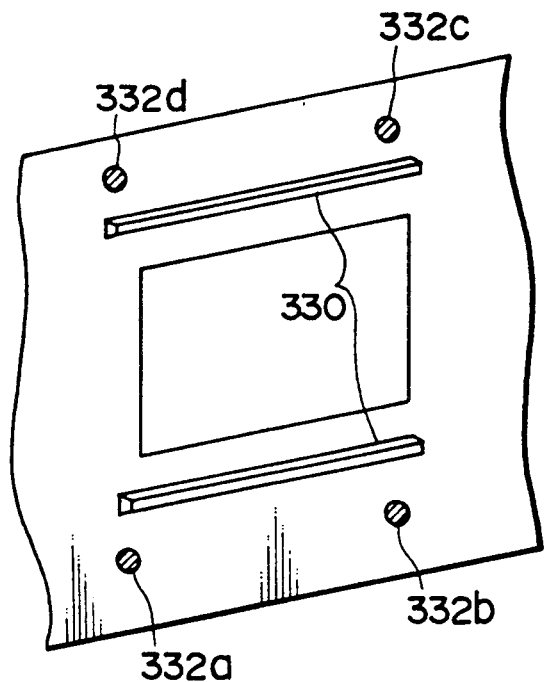
FIG. 30 is a view showing another arrangement of the press plate portion.
Figure 31:
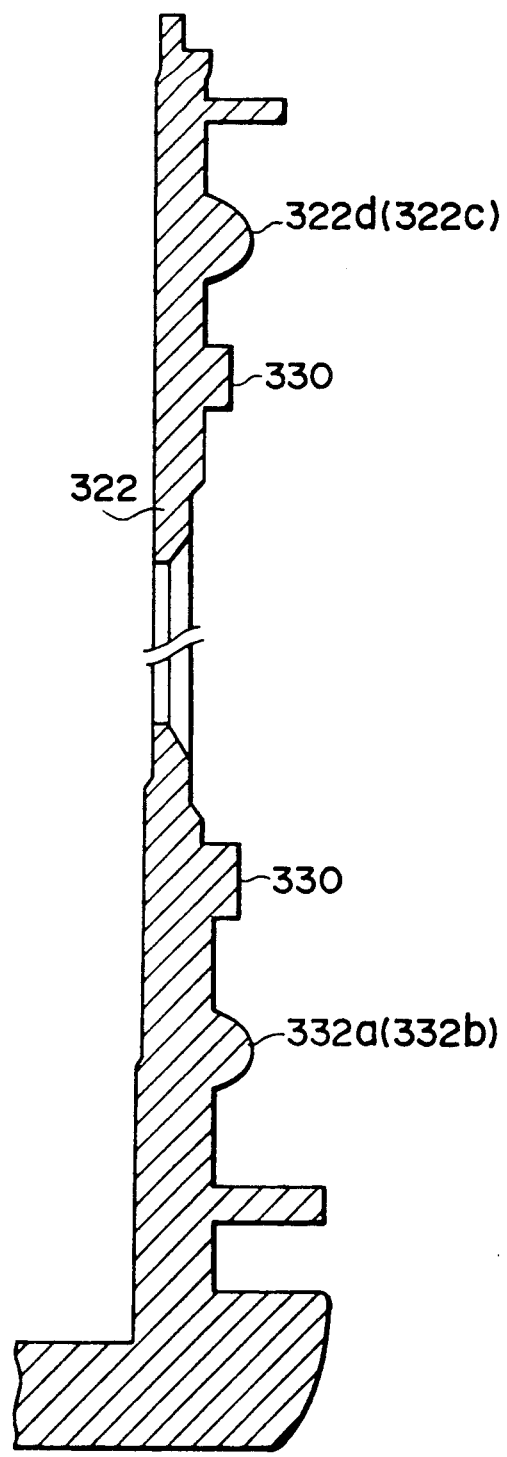
FIG. 31 is a sectional view showing a structure member in FIG. 30.

FIG. 30 shows another arrangement of a press plate portion. Film guide rails 330 extend from the structural member 322. Four press plate seats, 332a, 332b, 332c, and 332d having a spherical shape are formed outside the aperture of the guide rails 330 and form predetermined steps from the guide rails 330. FIG. 31 is a sectional view showing the structural member 322. The press palate seats 332a, 332b, 332c, and 332d are integrally formed with the structural member 322 and may be molded or may be obtained by adhering independent members on the structural member 322.

Figure 32:
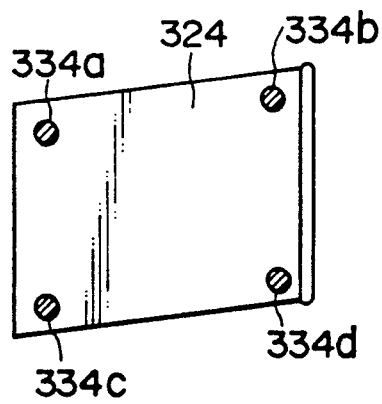
FIG. 32 is a view showing another arrangement of a press plate position regulating member.

FIG. 32 shows another press plate position regulating portion. Spherical projections 334a, 334b, 334c, and 334d are formed on the aperture-side surface of the press plate 324 which opposes the film, near corners which abut against the structural member 322. A flat surface (not shown) is formed at a portion of the structural member 322 which is brought into contact with the projections 334a, 334b, 334c, and 334d.

One of the contact portions of the press plate 324 and the structural member 322 is formed into a spherical shape, so that the press plate 324 can smoothly follow the X- or Y-direction camera vibration correction. In recent years, a plastic molding technique has been greatly advanced, and spherical projections can be formed while flatness with extremely high precision is maintained. Formation of the contact surface of the press plate 324 of the present invention is facilitated and provides an excellent effect.

The present invention is not limited to a camera of a type for detecting a camera vibration and causing a drier to drive a camera vibro-isolating mechanism to correct a camera vibration, but can provide the same effect as described above in a camera wherein a camera photographic device is swingably held from a casing member through a vibro-isolating rubber or a damper to reduce the camera vibration by forming a contact portion of a press plate into a semispherical shape.

Figure 33:
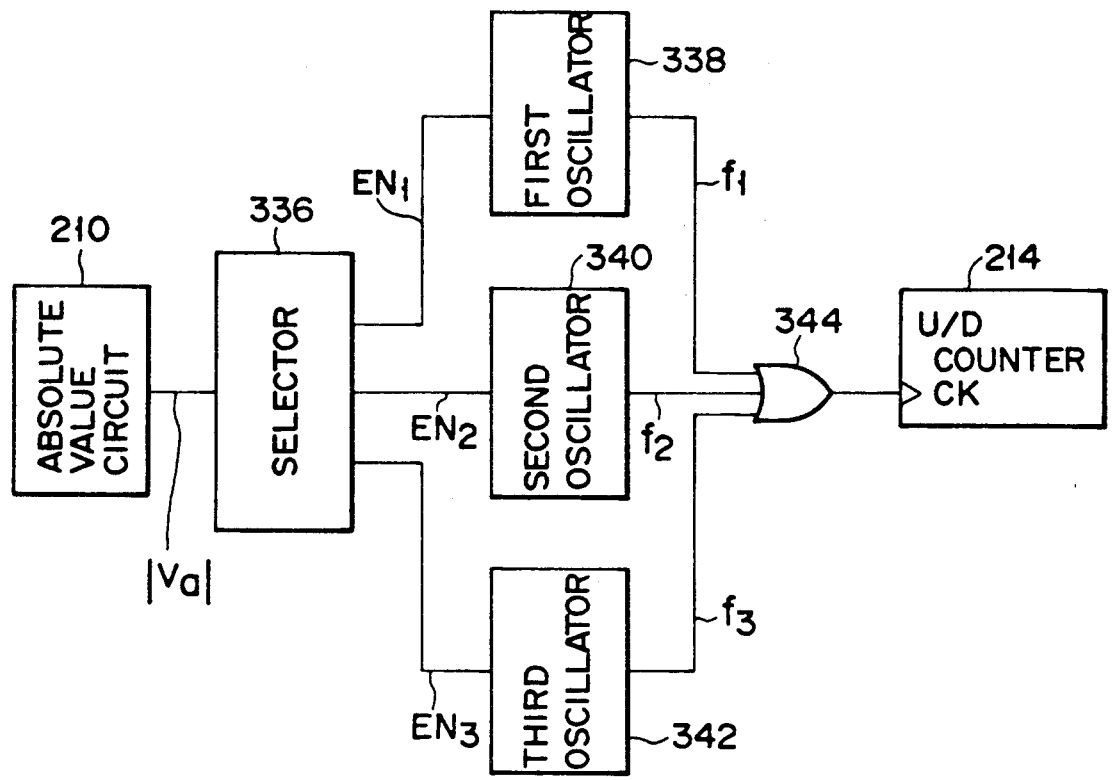
FIG. 33 is a block diagram showing another arrangement of a control unit.

In the above embodiment, the VCO is used to generate a clock having a frequency corresponding to an acceleration signal supplied to the U/D counter. However, the present invention is not limited to this arrangement. For example, a plurality of oscillators may be used in place of the VCO. FIG. 33 shows such an arrangement of the control circuit 220. More specifically, the absolute value $|V_a|$ of the acceleration signal $V_a$ is input from the absolute value circuit 210 to a selector 336. This selector 336 selectively outputs an enable signal $E_{N1}$, $E_{N2}$, or $E_{N3}$ for selecting one of first to third oscillators 338, 340, and 342 in accordance with the magnitude of the input absolute value $|V_a|$. An oscillation frequency $f_1$ of the first oscillator 338, an oscillation frequency $f_2$ of the second oscillator 340, and an oscillation frequency $f_3$ of the third oscillator 342 satisfy condition $f_1 > f_2 > f_3$. The oscillators 338, 340, and 342 are operated in response to the corresponding enable signals, A pulse from the selected one of the oscillators 338, 340, and 342 is input to a clock input terminal CK of the U/D counter 214 through an OR gate 344.

Figure 34:
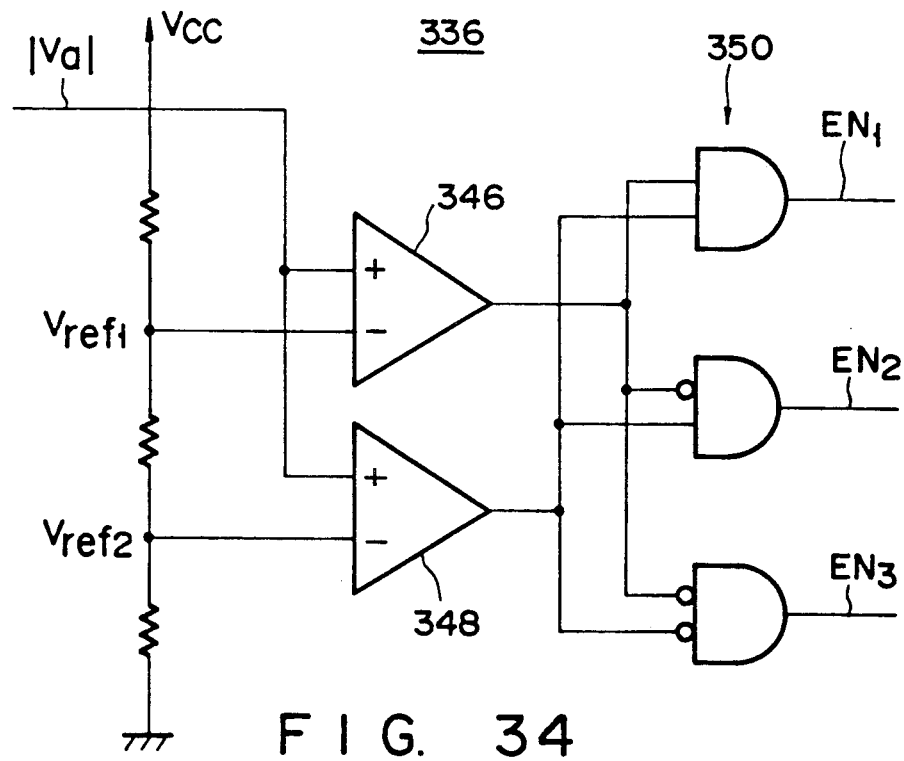
FIG. 34 is a diagram showing a selector in FIG. 33.

The selector 336 is arranged, as shown in FIG. 34. More specifically, the magnitude of the absolute value $|V_a|$ from the absolute value circuit 210 is determined by comparators 346 and 348, and comparison results are gated through a logic gate circuit 350, thereby selectively outputting the enable signals $E_{N1}$, $E_{N2}$, and $E_{N3}$.

Another initializing operation will be described below. The sequence control circuit starts a vibro-isolating operation in response to the vibro-isolating ON signal. The sequence control circuit receives a second release signal to perform a mirror-up operation and aperture driving, and starts exposure. At the end of exposure, the mirror and the aperture are reset, a film is wound, and the shutter is charged. The sequence control circuit receives as a vibro-isolating OFF signal a signal representing the end of exposure after the second release operation or a signal for predicting the above operation. The vibro-isolating OFF signal may be a shutter closing completion switch, a mirror/aperture reset signal, or a signal generated upon resetting of the mirror or aperture.

The sequence control circuit may receive a signal generated after the start of exposure or the second release operation, count mechanism driving or exposure time by using internal CPU or external clocks, predict the end of exposure, and terminate the vibro-isolating operation at the predicted timing. A signal for terminating the vibro-isolating operation and starting the initializing operation is preferably generated at a timing when the initializing operation is performed in a mirror-down state upon completion of exposure because a finger image can be observed during the initialization. A sequence for generating a signal for performing operations such as mirror resetting by the initializing operations may be employed.

An operation of the sequence control circuit will be described below. Upon detection of a vibro-isolating OFF timing, in order to drive the actuator, an integrator signal sent to the actuator control circuit is switched to a signal from a pseudo speed signal generator for initialization, thereby performing the initializing operation. In this operation, an appropriate signal independent from a vibro-isolating signal is supplied to the actuator control circuit, and the actuator is rotated to the limit in the CCW direction. Thereafter, the actuator is rotated in the CW direction, and the main pulses from the rotary encoder are monitored and counted to drive the actuator to a predetermined position. The operation is then ended. The actuator is stopped by changing the signal $S_{BO}$ from "H" level to "L" level to cause the actuator control signal to generate a drive signal having an appropriate waveform.

In this case, when integration is performed by CPU arithmetic operations through an A/D converter, the above operation can be advantageously performed without modifying the hardware arrangement. After the stop of the actuator, an integrated speed signal may be output again, or the signal is kept at a predetermined value until the next vibro-isolating operation.

Figure 36:
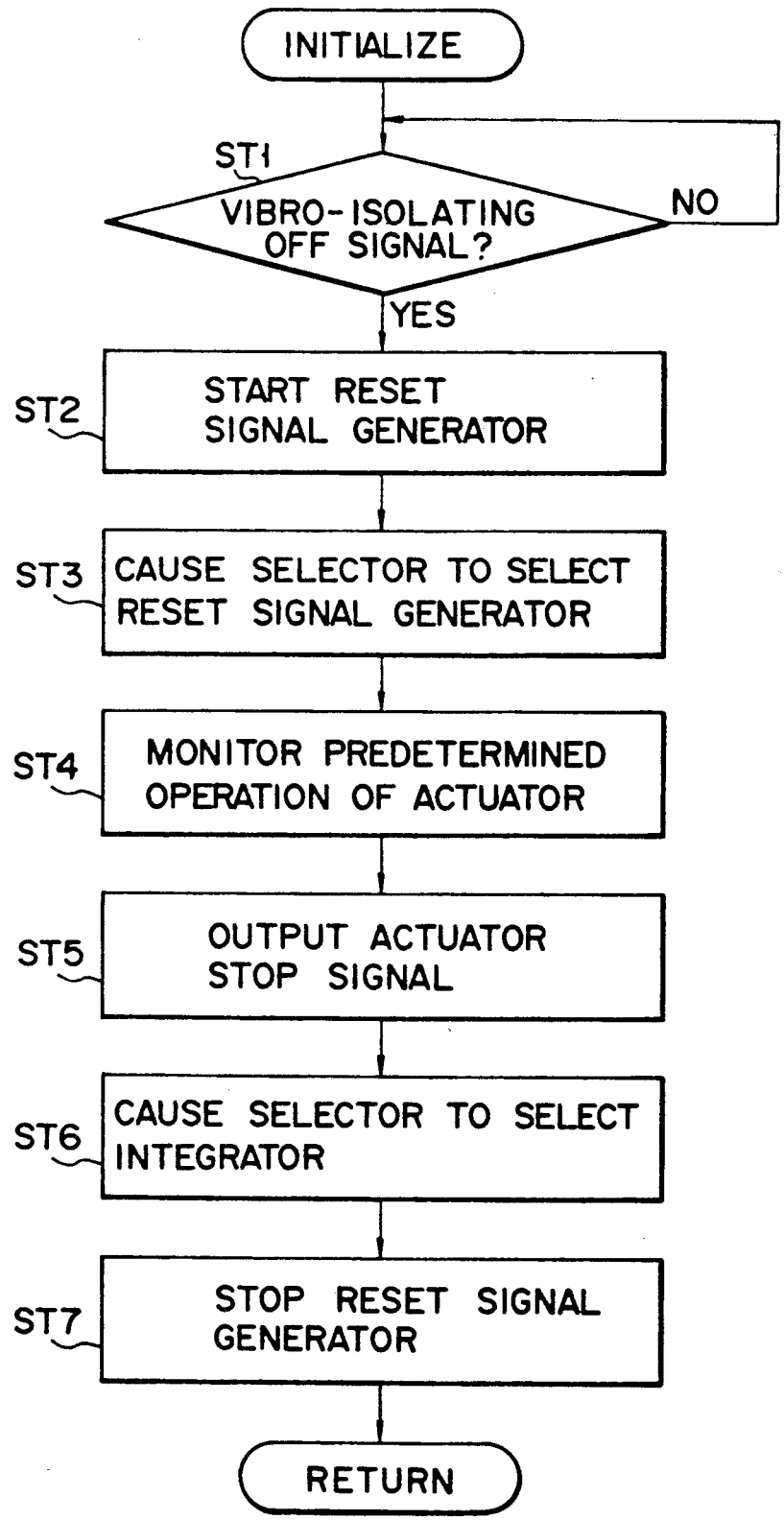
FIG. 36 is a flow chart for explaining an operation of the circuit shown in FIG. 35.
Figure 37:
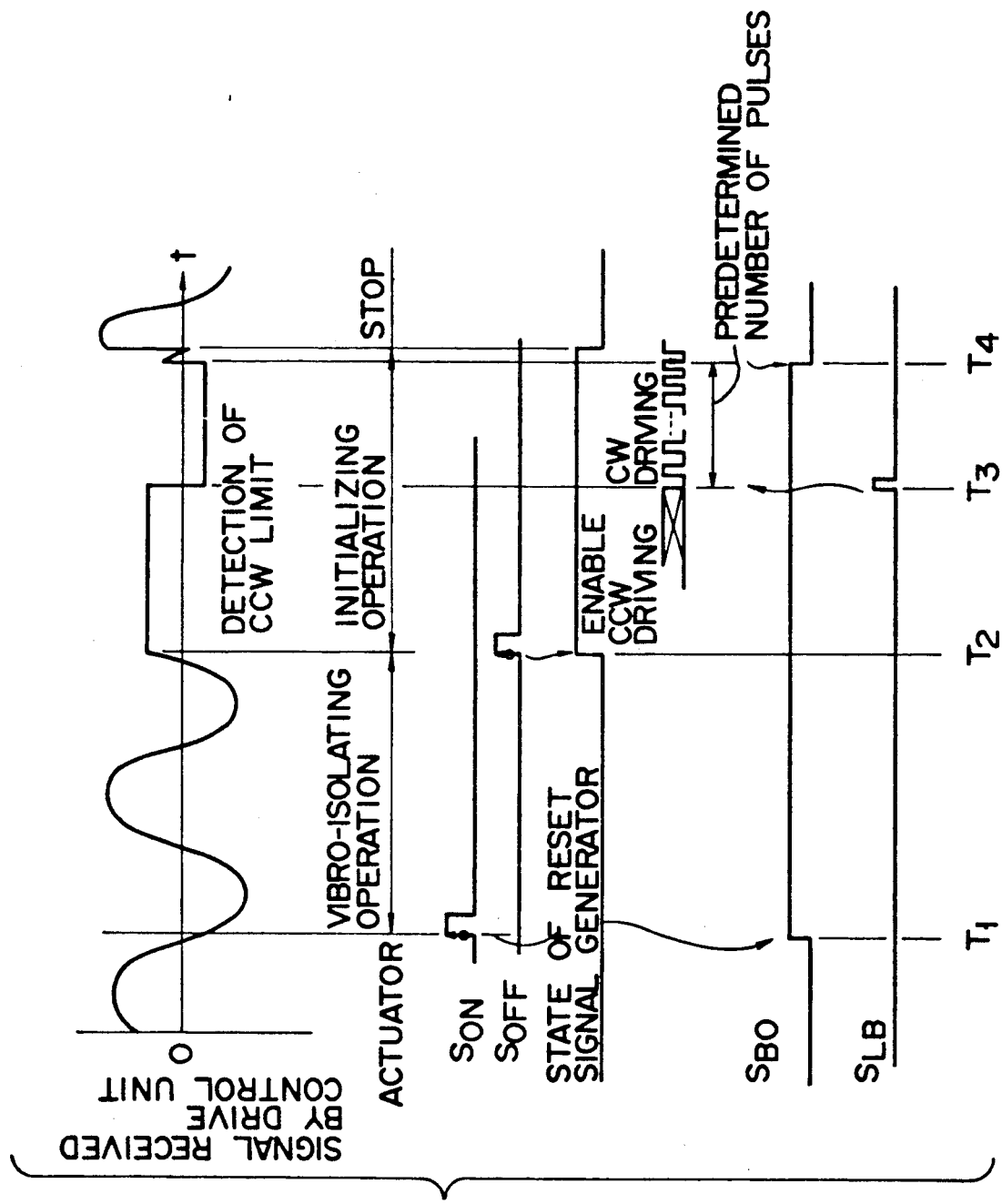
FIG. 37 is a timing chart for explaining the operation of the circuit shown in FIG. 35.

The initializing operation will be described in detail with reference to FIGS. 35 to 37. A normal vibro-isolating operation will be described first. At time T1, when a sequence control unit 352 receives a vibro-isolating ON signal $S_{ON}$ generated in response to half depression (first release) of the release button or the start of exposure from a vibro-isolating ON signal generator 354, the sequence control unit 352 sends a start signal ($S_{BO}$="H") to a drive control unit 356. At the same time, the sequence control unit 352 causes a selector 358 to select a speed signal from an integrator 360. The speed signal is a signal obtained by causing the integrator 360 to integrate the acceleration signal detected by each acceleration detector 362. The drive control unit 356 drives an actuator (USM) 364 in accordance with a speed signal selected by the selector 358, thereby performing a vibro-isolating operation.

The vibro-isolating operation continues until an exposure end signal (e.g., a shutter rear curtain stop signal) is input rom a vibro-isolating OFF signal generator 366 to the sequence control unit 352 as the vibro-isolating OFF signal $S_{OFF}$ (i.e., until time T2). Therefore, the vibro-isolating operation of this embodiment is performed during at least the exposure period.

The initializing operation will be described with reference to FIG. 36. When the sequence control unit 352 receives the vibro-isolating OFF signal $S_{OFF}$ (step ST1), the present vibro-isolating operation is completed, and the initializing operation is started. A reset signal generator 368 is started (step ST2) to cause the selector 358 to select the initialize drive signal from the reset signal generator 368 (step ST3). The drive control unit 356 receives the initialize drive signal, the actuator 364 is rotated to the limit in the CCW direction, and the actuator 364 is rotated in the CW direction at time T3.

The position of the actuator 364 is monitored by a position detector 370, and the monitored position is sent to the sequence control unit 352 as position information (step ST4). When the sequence control unit 352 determines that the actuator 364 reaches a predetermined initialization position, the sequence control unit 352 sends a stop signal to the drive control unit 356 (step ST5) and stops the actuator 364. Thereafter, the sequence control unit 352 causes the selector 358 to select a speed signal again (step ST6) and stops the reset signal generator 368 (step ST7), thereby completing a series of operations.

The state of the reset signal generator 368 is enabled in response to the vibro-isolating OFF signal $S_{OFF}$. A signal input to the drive control unit 356 is switched form the speed signal to the pseudo signal. When the actuator 364 is driven to the limit in the CCW direction, a limit detection signal ($S_{LB}$) is output from the position detector 370 to the sequence control unit 352. The sequence control unit 352 receives the limit detection signal and drives the actuator 364 in the CW direction. A pulse signal is generated by the position detector 370 during driving of the actuator 364. When the number of pulses output from the position detector 370 reaches a predetermined value, i.e., at time T4, the sequence control unit 352 sets the signal $S_{BO}$ to "L" level to terminate the initializing operation.

As has been described above, according to the present invention, the clock generator for generating a clock having a frequency corresponding to the acceleration signal is arranged. The lock is input from the clock generator to the up/down counter. The frequency of the clock input to the up/down counter is changed in accordance with the acceleration, and the speed and acceleration of the actuator can be controlled. Therefore, the actuator can accurately follow a vibration having abrupt changes in speed and acceleration, thereby providing an optical system vibro-isolating method and apparatus which can properly eliminate the camera vibration.

According to the present invention, the start timing of the operation of the actuator coincides with the zero speed of the vibration. A large acceleration which is required in the conventional system is not required, and the actuator can be gradually accelerated in accordance with the acceleration of the camera vibration. Therefore, there is provided an optical system vibro-isolating method and apparatus free from ringing and capable of performing an accurate vibro-isolating operation immediately after the start of operation.

According to the present invention, every time the vibro-isolating operation is completed, the initializing operation is performed to return the optical system to an intermediate position within the pivotal range. The optical system returns to a position where the optical system can be pivoted in either direction at the start of the vibro-isolating operation. Therefore, there is provided an optical system vibro-isolating apparatus which can prepare for the next vibro-isolating operation.

According to the present invention, therefore, there is provided an optical system vibro-isolating apparatus capable of improving accuracy of a tracking operation for a vibration of the optical system.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for vibro-isolating an optical system, comprising:
   acceleration sensor means for detecting an acceleration generated upon a vibration of said optical system and for generating an acceleration signal;
   absolute value means for receiving the acceleration signal output from said acceleration sensor means, obtaining an absolute value of the acceleration signal, and outputting an absolute value signal;
   oscillating means for receiving the absolute value signal output from said absolute value means, and outputting an oscillation signal having a frequency corresponding to the absolute value signal so that the frequency is high when the absolute value signal is large and the frequency is low when the absolute value signal is small;
   an up/down counter for receiving the oscillation signal output from said oscillating means, counting the oscillation signal, and outputting a count value;
   a motor for driving said optical system in a direction to cancel the vibration of said optical system;
   motor control means for receiving the count value output from said up/down counter and controlling said motor at a speed corresponding to the count value;
   detecting means for detecting a speed of said motor driven by said motor control means and for outputting a motor speed signal;
   integrating means for receiving the acceleration signal output from said acceleration sensor means, integrating the acceleration signal, and outputting a vibration speed signal; and
   comparator mean for receiving the motor speed signal output from said detecting means and the vibration speed signal output from said integrating means, comparing the motor speed signal with the vibration speed signal, and outputting a control signal for switching between count-up and count-down operations of said up/down counter in accordance with a comparison result.

2. The apparatus according to claim 1, wherein prior to a start of a vibro-isolating operation of said apparatus, said up/down counter outputs a predetermined preset value to said motor control means.

3. The apparatus according to claim 2, wherein said motor control means comprises a digital/analog converter for generating a positive voltage corresponding to the count value when the count value from said up/down counter is larger than the preset value, for generating a negative voltage corresponding to the count value when the count value is smaller than the preset value, and for determining a rotational direction of said motor in accordance with a sign of the voltage.

4. The apparatus according to claim 2, further comprising inhibiting means, connected between said up/down counter and said comparing means, for receiving the count value output from said up/down counter and inhibiting input of the switching control signal from said comparing means to said up/down counter when the count value is one of upper and lower limits.

5. An apparatus for vibro-isolating an optical system, comprising:
   acceleration sensor means for detecting an acceleration generated upon a vibration of said optical system and for generating an acceleration signal;
   absolute value means for receiving the acceleration signal output from said acceleration sensor means, obtaining an absolute value of the acceleration signal, and outputting an absolute value signal;
   oscillating means, having at least a first oscillator oscillated at a first frequency and a second oscillator oscillated at a second frequency lower than the first frequency, for receiving the absolute value signal output from said absolute value means, selecting said first oscillator when the absolute value signal is larger than a predetermined magnitude, selecting said second oscillator when the absolute value signal is smaller than the predetermined magnitude, and outputting the oscillation signal of the selected one of said first and second oscillators;
   an up/down counter for receiving the oscillation signal output from said oscillating means, counting the oscillation signal, and outputting a count value;
   a motor for driving said optical system in a direction to cancel the vibration of said optical system;
   motor control means for receiving the count value output from said up/down counter and controlling said motor at a speed corresponding to the count value;
   detecting means for detecting a speed of said motor driven by said motor control means and for outputting a motor speed signal;
   integrating means for receiving the acceleration signal output from said acceleration sensor means, integrating the acceleration signal, and outputting a vibration speed signal; and
   comparator means for receiving the motor speed signal output from said detecting means and the vibration speed signal output from said integrating means, comparing the motor speed signal with the vibration speed signal, and outputting a control signal for switching between count-up and count-down operations of said up/down counter in accordance with a comparison result.

6. The apparatus according to claim 5, wherein prior to a start of a vibro-isolating operation of said apparatus, said up/down counter outputs a predetermined preset value to said motor control means.

7. The apparatus according to claim 6, wherein said motor control means comprises a digital/analog converter for generating a positive voltage corresponding to the count value when the count value from said up/down counter is larger than the preset value, for generating a negative voltage corresponding to the count value when the count value is smaller than the preset value, and for determining a rotational direction of said motor in accordance with a sign of the voltage.

8. The apparatus according to claim 6, further comprising inhibiting means, connected between said up/down counter and said comparing means, for receiving the count value output from said up/down counter and inhibiting input of the switching control signal from said comparing means to said up/down counter when the count value is one of upper and lower limits.

9. An apparatus for vibro-isolating an optical system, comprising:
   acceleration detecting means for detecting an acceleration of a vibration of said optical system;
   oscillating means for oscillating a signal at a frequency corresponding to the acceleration detected by said acceleration detecting means;
   a counter for counting oscillation operations of said oscillating means; and
   motor control means for controlling, at a speed corresponding to a count value of said counter, a motor for driving said optical system in a direction to cancel the vibration of said optical system.

10. An apparatus for vibro-isolating an optical system, comprising:
    an optical system capable of being driven to cancel a vibration thereof;
    driving means for driving said optical system by a motor;
    motor speed detecting means for detecting an operating speed of said motor;
    a sensor for detecting an acceleration of the vibration of the optical system;
    vibration speed detecting means for integrating an acceleration signal output from said sensor to obtain the vibration speed;
    comparing means for comparing the operating speed of said motor detected by said motor speed detecting means with the vibration speed obtained by said vibration speed detecting means;
    clock generating means for generating a clock having a frequency corresponding to an absolute value of the acceleration signal output from said sensor;
    an up/down counter for determining a count direction in accordance with a comparison result of said comparing means and counting the clocks generated by said clock generating means; and
    control signal output means for supplying the motor drive control signal to said driving means on the basis of the count value of said up/down counter.

11. The apparatus according to claim 10, wherein said clock generating means includes a voltage-controlled oscillator whose oscillating frequency is determined in accordance with an absolute value of the acceleration signal.

12. The apparatus according to claim 10, wherein said clock generating means includes a plurality of oscillators oscillated at different frequencies and selecting means for selecting one of said plurality of oscillators in accordance with a magnitude of the absolute value of the acceleration signal.

13. An apparatus for vibro-isolating an optical system, comprising:
    vibration speed signal output means for detecting a vibration speed signal of said optical system and outputting the vibration speed signal;
    control means for outputting an actuator drive control signal to prevent a vibration of said optical system on the basis of the vibration speed signal output from said vibration speed signal output means;
    zero speed detecting means for receiving the vibration speed signal output from said vibration speed signal output means, detecting that the vibration speed signal becomes zero, and outputting the zero speed signal; and
    vibro-isolating ON/OFF control means for outputting the vibro-isolating signal for driving said control means in response to the first zero speed signal output from said zero speed detecting means after reception of a vibro-isolating ON signal for vibro-isolating said optical system.

14. The apparatus according to claim 13, wherein said apparatus is arranged in a camera, and
    further comprising vibro-isolating ON signal generating means for generating the vibro-isolating ON signal in response to depression of a release button of said camera.

15. The apparatus according to claim 13, wherein said apparatus is arranged in a single-lens reflex camera, and
    further comprising vibro-isolating ON signal generating means for generating the vibro-isolating ON signal in response to upward movement of a movable mirror in said camera.

16. The apparatus according to claim 13, wherein said vibration speed signal output means comprises an acceleration sensor for detecting an acceleration generated by the vibration and an integrator for integrating the acceleration signal output from said acceleration sensor.

17. The apparatus according to claim 13, further comprising:
    drive speed detecting means for detecting a drive speed of said actuator; and wherein
    said control means compares the vibration speed signal from said vibration speed signal output means with the drive speed signal from said drive speed detecting means, and outputting the drive control signal in accordance with a comparison result of the vibration speed signal and the drive speed signal.

18. The apparatus according to claim 13, further comprising:
    limit detecting means for outputting a limit stop signal upon detecting that said actuator reaches a drive limit position, and wherein
    said vibro-isolating ON/OFF control means stops outputting the vibro-isolating signal to said control means when the limit stop signal is output from said limit detecting means.

19. An apparatus for vibro-isolating an optical system, comprising:
    vibro-isolating ON signal generating means for generating a vibro-isolating ON signal for vibro-isolating said optical system;
    vibration speed detecting means for detecting a vibration speed of said optical system and outputting a vibration speed signal;
    vibro-isolating operation start signal generating means for outputting a vibro-isolating operation start signal when the vibration speed signal output from said vibration speed detecting mean becomes zero after the vibro-isolating ON signal is output from said vibro-isolating ON signal generating means;
    an actuator for driving said optical system in a direction to cancel the vibration of said optical system; and
    control means for outputting a control signal for controlling said actuator, in response to the vibro-isolating operation start signal output from said vibro-isolating operation start signal generating means.

20. A camera vibro-isolating apparatus comprising:
an optical system capable of being driven to cancel a vibration thereof;
an actuator for driving said optical system;
a driver for driving said actuator;
an acceleration sensor for detecting an acceleration of the vibration of said optical system;
converting means for integrating the acceleration signal output from said acceleration sensor to convert the acceleration signal into a speed signal;
signal generating means for generating a vibro-isolating start signal when the speed signal output from said converting means becomes zero for the first time after reception of a vibro-isolating ON signal output prior to an exposure operation of a camera; and
vibro-isolating control means for receiving the vibro-isolating start signal from said signal generating means and controlling said driver to start a vibro-isolating operation on the basis of the speed signal from said converting means.

21. The apparatus according to claim 20, further comprising vibro-isolating ON signal generating means for outputting the vibro-isolating ON signal in association with a release operation of the camera.

22. The apparatus according to claim 20, wherein said vibro-isolating control means completes the vibro-isolating operation at the end of the exposure operation of the camera.

23. A vibro-isolating control method in a camera vibro-isolating apparatus for detecting a vibration speed, driving an optical system to cancel the vibration on the basis of the vibration speed, and performing a vibration correction operation for correcting the vibration, comprising the steps of:
receiving a vibro-isolating ON signal output prior to an exposure operation of a camera; and
starting the vibration correction operation when the vibration speed becomes zero for the first time after the vibro-isolating signal is received.

24. A vibro-isolating control method in a camera having a vibro-isolating mechanism for detecting a vibration speed and driving an optical system to cancel the vibration on the basis of the vibration speed, comprising the steps of:
starting a vibration speed detection operation in synchronism with a start signal generated in correspondence with an operation of an operation member of said camera;
starting a vibro-isolating operation of said vibro-isolating mechanism in synchronism with a vibro-isolating ON signal generated after the start signal and a speed zero signal representing that the vibration speed becomes zero for the first time; and
stopping eh vibro-isolating operation of said vibro-isolating mechanism in synchronism with an end signal generated at the end of the exposure operation of said camera.

25. An apparatus for vibro-isolating an optical system in a camera, comprising:
a sensor for detecting a vibration of said optical system;
an actuator for driving said optical system in a direction to cancel the vibration;
control means for receiving an output from said sensor and outputting a control signal to said actuator to cancel the vibration; and
reset means for driving said optical system by means of said actuator to a substantially intermediate position with a drive enable range in response to a vibro-insulating OFF control signal output at an end of a photographic operation.

26. The apparatus according to claim 25, further comprising:
position detecting means for detecting a position of an optical member in said optical system driven by said actuator, and wherein
said reset means drives said actuator in one direction until a position signal from said position detecting means represents a limit position of said optical system upon reception of the vibro-isolating OFF control signal, drives said actuator in a direction opposite to said one direction after the position signal represents the limit position, and thereafter stops driving said actuator when the position signal from said position detecting means reaches a predetermined value.

27. The apparatus according to claim 25, wherein said camera is a single-lens reflex camera having a movable mirror, and
further comprising vibro-isolating OFF control signal generating means for outputting the vibro-isolating OFF control signal when said movable mirror is moved from an upper position to a lower position.

28. The apparatus according to claim 25, further comprising vibro-isolating OFF signal generating means for outputting the vibro-isolating OFF control signal in response to perfect closing of a shutter of said camera.

29. The apparatus according to claim 25, wherein said sensor includes an acceleration sensor for detecting an acceleration of the vibration.

30. A camera vibro-insulating apparatus comprising:
an optical system capable of being driven to cancel a vibration thereof;
driving means for driving said optical means by a motor;
position detecting means for detecting a position of said optical system;
speed detecting means for detecting a speed of the vibration of said optical system; and
control signal output means for supplying a drive signal for canceling the vibration on the basis of a speed signal from said speed detecting means at least during an exposure operation, and for supplying a drive signal for moving aid optical system to an intermediate position within a drive enable range on the basis of an output from aid position detecting means after the end of the exposure operation.

31. An apparatus for vibro-isolating an optical system, comprising:
a sensor for detecting an acceleration of a vibration of said optical system;
an actuator for driving aid optical system in a direction to cancel the vibration;
control means for receiving an output from said sensor and outputting a control signal to cancel the vibration;
speed detecting means for outputting a speed signal on the basis of an output from said sensor;
timing means for detecting a timing at which the speed signal output from said speed detecting means becomes zero, and for outputting a timing signal; and reset means for returning said optical system to a substantially intermediate position within a drive enable range, and wherein said control means starts a control operation for said actuator on the basis of an output from aid sensor in response to the timing signal from said timing means upon reception of the vibro-isolating ON signal, and actuates said reset means upon reception of the vibro-isolating OFF signal.

32. The apparatus according to claim 31, wherein said optical system vibro-isolating apparatus is arranged in a camera, and further comprising vibro-isolating ON signal generating means for generating the vibro-isolating ON signal in response to depression of a release button of said camera.

33. The apparatus according to claim 31, wherein said optical system vibro-isolating apparatus is arranged in a single-lens reflex camera having a movable mirror, and further comprising vibro-isolating OFF control signal generating means for outputting the vibro-isolating OFF control signal when said movable mirror is moved from an upper position to a lower position.

* * * * *